US008078512B1

(12) United States Patent
Haberaecker et al.

(10) Patent No.: US 8,078,512 B1
(45) Date of Patent: Dec. 13, 2011

(54) DOCUMENT MANIFEST AND PUBLICATION IN ASSOCIATION WITH DATASET QUALITY CONTROL

(75) Inventors: Charlotte Haberaecker, Annandale, VA (US); J. Harvey Trimble, Jr., Great Falls, VA (US); Mark Oliphant, Easton, MD (US); N. Grande Bucca, Tenafly, NJ (US); Cynthia H. Keith, Great Falls, VA (US)

(73) Assignee: CoreLogic Real Estate Solutions, LLC, Santa Ana, CA (US)

( * ) Notice: Subject to any disclaimer, the term of this patent is extended or adjusted under 35 U.S.C. 154(b) by 1291 days.

(21) Appl. No.: 10/989,559

(22) Filed: Nov. 17, 2004

Related U.S. Application Data

(63) Continuation-in-part of application No. 10/405,890, filed on Apr. 1, 2003, now abandoned, which is a continuation-in-part of application No. 10/326,570, filed on Dec. 20, 2002.

(60) Provisional application No. 60/369,030, filed on Apr. 1, 2002.

(51) Int. Cl.
*G06Q 40/00* (2006.01)

(52) U.S. Cl. ........................................... 705/35; 705/28

(58) Field of Classification Search ..................... 705/35
See application file for complete search history.

(56) References Cited

U.S. PATENT DOCUMENTS

| | | | |
|---|---|---|---|
| 5,615,268 | A | 3/1997 | Bisbee et al. |
| 5,748,738 | A | 5/1998 | Bisbee et al. |
| 6,189,009 | B1 | 2/2001 | Stratigos et al. |
| 6,209,095 | B1 | 3/2001 | Anderson et al. |
| 6,237,096 | B1 | 5/2001 | Bisbee et al. |
| 6,289,460 | B1 | 9/2001 | Hajmiragha |
| 6,367,013 | B1 | 4/2002 | Bisbee et al. |
| 6,438,526 | B1 | 8/2002 | Dykes et al. |
| 6,452,614 | B1 | 9/2002 | King et al. |
| 6,456,981 | B1 | 9/2002 | Dejaeger et al. |
| 6,594,633 | B1 | 7/2003 | Broerman |
| 6,609,200 | B2 | 8/2003 | Anderson et al. |
| 6,635,089 | B1 | 10/2003 | Burkett et al. |
| 6,751,632 | B1 | 6/2004 | Petrogiannis |

(Continued)

FOREIGN PATENT DOCUMENTS

JP 2003256744 9/2003

(Continued)

OTHER PUBLICATIONS

The Perfect Structure ; Jones, James D; Mortgage Banking v56n7 pp. 70-78 Apr. 1996 Issn:0730-0121 Jrnl Code: MOB.*

(Continued)

*Primary Examiner* — Ella Colbert
*Assistant Examiner* — John Anderson
(74) *Attorney, Agent, or Firm* — Knobbe, Martens, Olson & Bear LLP

(57) ABSTRACT

Quality control for determinations that documents are accurate and sufficient to support various transactions. In one aspect, a document manifest is provided in connection with quality control results and corresponding reports. The document manifest lists documents that are required for a particular transaction. The list may also be associated with document publication pursuant to the transaction. The document publication aspect allows dataset quality control procedures to be associated with documents published for a transaction. This aspect also allows confirmation that the appropriate version of the published set of documents is or was used for the transaction.

25 Claims, 15 Drawing Sheets

U.S. PATENT DOCUMENTS

| | | | | |
|---|---|---|---|---|
| 7,333,943 | B1 * | 2/2008 | Charuk et al. | 705/26 |
| 2001/0005829 | A1 | 6/2001 | Raveis | |
| 2001/0018739 | A1 * | 8/2001 | Anderson et al. | 713/176 |
| 2001/0029482 | A1 * | 10/2001 | Tealdi et al. | 705/38 |
| 2001/0044764 | A1 | 11/2001 | Arnold | |
| 2002/0010679 | A1 | 1/2002 | Felsher | |
| 2002/0019838 | A1 | 2/2002 | Petrogiannis | |
| 2002/0029194 | A1 | 3/2002 | Lewis et al. | |
| 2002/0035578 | A1 | 3/2002 | Stratigos et al. | |
| 2002/0049624 | A1 | 4/2002 | Raveis | |
| 2002/0052814 | A1 | 5/2002 | Ketterer | |
| 2002/0059137 | A1 | 5/2002 | Freeman et al. | |
| 2002/0069358 | A1 | 6/2002 | Silvester | |
| 2002/0073020 | A1 | 6/2002 | McFarland et al. | |
| 2002/0078159 | A1 | 6/2002 | Petrogiannis et al. | |
| 2002/0091651 | A1 | 7/2002 | Petrogiannis et al. | |
| 2002/0116321 | A1 | 8/2002 | Arehart | |
| 2002/0116331 | A1 | 8/2002 | Cataline et al. | |
| 2002/0116531 | A1 | 8/2002 | Chu | |
| 2002/0123959 | A1 * | 9/2002 | Mozley et al. | 705/37 |
| 2002/0128969 | A1 | 9/2002 | Parmelee et al. | |
| 2002/0129256 | A1 | 9/2002 | Parmelee et al. | |
| 2002/0129257 | A1 | 9/2002 | Parmelee et al. | |
| 2002/0143711 | A1 | 10/2002 | Nassiri | |
| 2002/0169702 | A1 | 11/2002 | Eaton, Jr. et al. | |
| 2002/0178035 | A1 | 11/2002 | Lajouanie | |
| 2003/0009418 | A1 | 1/2003 | Green et al. | |
| 2003/0036994 | A1 | 2/2003 | Witzig et al. | |
| 2003/0055783 | A1 | 3/2003 | Cataline et al. | |
| 2003/0074297 | A1 | 4/2003 | Carragher | |
| 2003/0110400 | A1 | 6/2003 | Cartmell et al. | |
| 2003/0120588 | A1 | 6/2003 | Dodd et al. | |
| 2003/0144948 | A1 | 7/2003 | Cleary et al. | |
| 2003/0158811 | A1 | 8/2003 | Sanders et al. | |
| 2003/0172296 | A1 | 9/2003 | Gunter | |
| 2003/0172297 | A1 | 9/2003 | Gunter | |
| 2003/0172298 | A1 | 9/2003 | Gunter et al. | |
| 2003/0172299 | A1 | 9/2003 | Gunter | |
| 2003/0177071 | A1 | 9/2003 | Treese et al. | |
| 2003/0182151 | A1 | 9/2003 | Taslitz | |
| 2003/0187756 | A1 * | 10/2003 | Klivington et al. | 705/27 |
| 2003/0208557 | A1 | 11/2003 | Higbee | |
| 2003/0225688 | A1 | 12/2003 | Dobbins | |
| 2003/0233418 | A1 | 12/2003 | Goldman | |
| 2004/0019558 | A1 * | 1/2004 | McDonald et al. | 705/38 |
| 2004/0111619 | A1 | 6/2004 | Laurie et al. | |
| 2008/0097898 | A1 * | 4/2008 | Hibbert et al. | 705/38 |
| 2008/0140494 | A1 * | 6/2008 | Charuk et al. | 705/8 |

FOREIGN PATENT DOCUMENTS

| | | |
|---|---|---|
| WO | WO0008541 | 2/2000 |
| WO | WO0019296 | 4/2000 |
| WO | WO0019315 | 4/2000 |
| WO | WO0049521 | 8/2000 |
| WO | WO0062140 | 10/2000 |
| WO | WO0127832 | 4/2001 |
| WO | WO0201479 | 1/2002 |
| WO | WO0203174 | 1/2002 |
| WO | WO0203774 | 1/2002 |
| WO | WO0221383 | 3/2002 |
| WO | WO0237367 | 5/2002 |
| WO | WO0237386 | 5/2002 |
| WO | WO02063431 | 8/2002 |
| WO | WO0275575 | 9/2002 |
| WO | WO02075615 | 9/2002 |
| WO | WO02075616 | 9/2002 |
| WO | WO02075617 | 9/2002 |
| WO | WO02075618 | 9/2002 |
| WO | WO03077130 | 9/2003 |

OTHER PUBLICATIONS

"Smart Document Specification—RC6.6", Mortage Bankers Association of America, Inc., Sep. 19, 2002, pp. 1-87.

"Guidelines for Document Custodians", Fannie Mae, Sep. 9, 1999.

* cited by examiner

```
<?xml version="1.0" encoding="UTF-8"?>
<!DOCTYPE ELECTRONICDOC SYSTEM "smartdoc_V1.dtd">
<ELECTRONICDOC DocId="MD01">
    <HEADER>
        <NAME Type="Note" State="Populated" Negotiable="True" MustBeRecorded="False"/>
        <AUDIT_TRAIL>
            <ENTRY Logger="Joe Smith" Action="Template" DateTime="2000-12-08 14:54:00"/>
            <ENTRY Logger="Doc Prep" Action="Populated" DateTime="2001-05-09T09:30:01"/>
        </AUDIT_TRAIL>
        <SIG_MODEL>
            {optional}
        </SIG_MODEL>
    </HEADER>
    <DATA Id="Data01">
        <MAIN>
            <LOAN><MORTGAGE_TERMS InterestRatePercent="6"/></LOAN>
            ...
            <BORROWER _FirstName="Rebecca" _MiddleName="Kate" _LastName="Thornton"/>
        </MAIN>
        <MAP Target="View01">
            <ARC DataEnd="//MORTGAGE_TERMS/@InterestRatePercent" ViewEnd="id(InterestRate)"/>
            ...
            <ARC DataEnd="//BORROWER/@_FirstName" ViewEnd="id(BorrowerNameFirst)"/>
            <ARC DataEnd="//BORROWER/@_MiddleName" ViewEnd="id(BorrowerNameMiddle)"/>
            <ARC DataEnd="//BORROWER/@_LastName" ViewEnd="id(BorrowerNameLast)"/>
        </MAP>
    </DATA>
```

620 (HEADER block)

630 (DATA block)

660 (MAIN block)

670 (MAP block)

```
<VIEW Id="View01" MimeType="text/html" Tagged="True">
        <html>
            <head>
                <title> NOTE </title>
            </head>
            <body>
                ...
                I will pay interest at a yearly rate of <span class="underlinedata"
                id="InterestRate">6</span>%. <br/>
                ...
                    <span id="BorrowerNameFirst">Rebecca</span>
                    <span id="BorrowerNameMiddle">Kate</span>
                    <span id="BorrowerNameLast">Thornton</span>
                ...
            </body>
        </html>
</VIEW>
```

650

```
<SIGNATURES>
        {Optional}
</SIGNATURES>
</ELECTRONICDOC>
```

600

FIG. 6B eQC RESULTS

Figure 8:
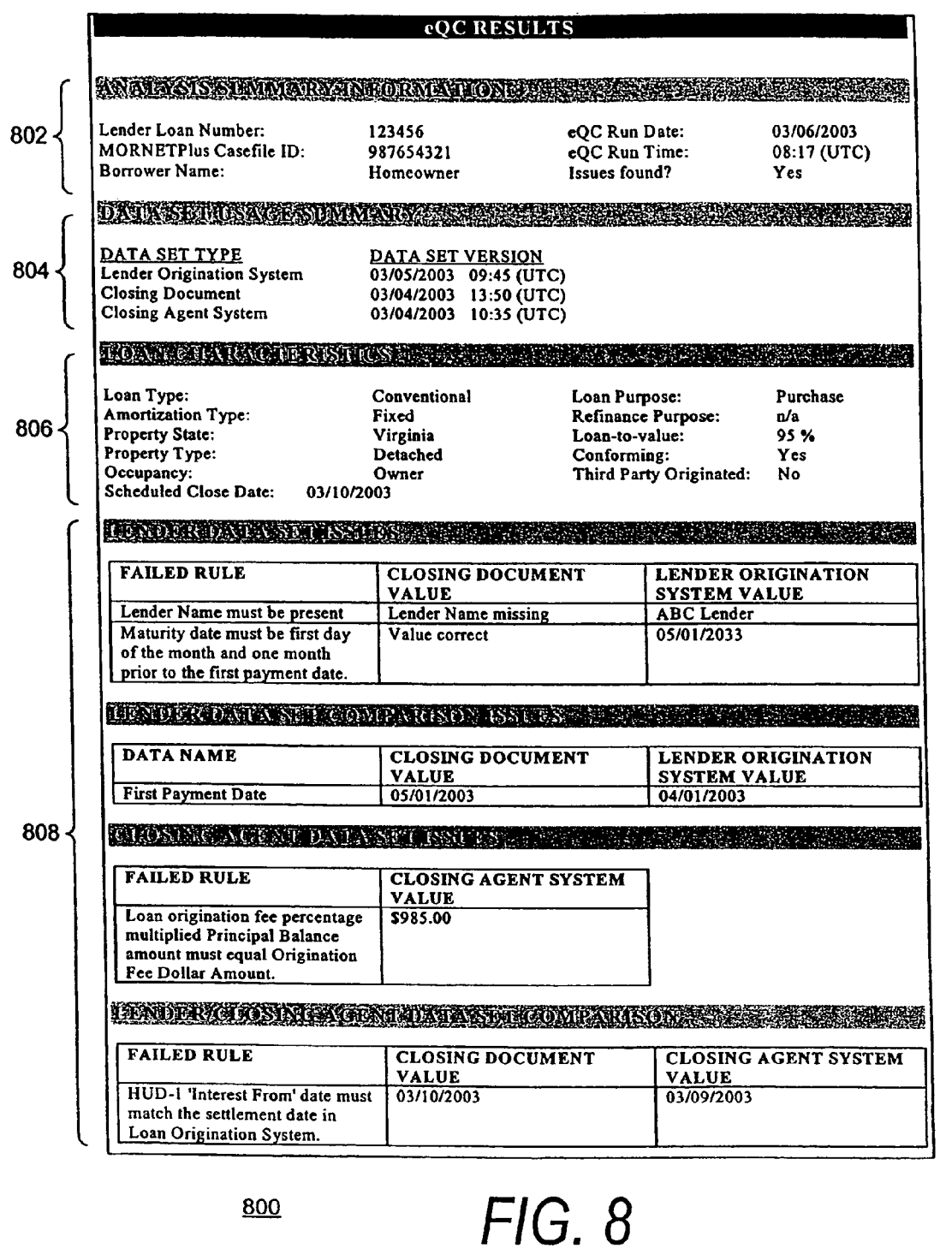

802

ANALYSIS SUMMARY INFORMATION

| | | | |
|---|---|---|---|
| Lender Loan Number: | 123456 | eQC Run Date: | 03/06/2003 |
| MORNETPlus Casefile ID: | 987654321 | eQC Run Time: | 08:17 (UTC) |
| Borrower Name: | Homeowner | Issues found? | Yes |

804

DATA SET USAGE SUMMARY

| DATA SET TYPE | DATA SET VERSION |
|---|---|
| Lender Origination System | 03/05/2003 09:45 (UTC) |
| Closing Document | 03/04/2003 13:50 (UTC) |
| Closing Agent System | 03/04/2003 10:35 (UTC) |

806

LOAN CHARACTERISTICS

| | | | |
|---|---|---|---|
| Loan Type: | Conventional | Loan Purpose: | Purchase |
| Amortization Type: | Fixed | Refinance Purpose: | n/a |
| Property State: | Virginia | Loan-to-value: | 95 % |
| Property Type: | Detached | Conforming: | Yes |
| Occupancy: | Owner | Third Party Originated: | No |
| Scheduled Close Date: | 03/10/2003 | | |

808

LENDER DATA SET ISSUES

| FAILED RULE | CLOSING DOCUMENT VALUE | LENDER ORIGINATION SYSTEM VALUE |
|---|---|---|
| Lender Name must be present | Lender Name missing | ABC Lender |
| Maturity date must be first day of the month and one month prior to the first payment date. | Value correct | 05/01/2033 |

LENDER DATA SET COMPARISON ISSUES

| DATA NAME | CLOSING DOCUMENT VALUE | LENDER ORIGINATION SYSTEM VALUE |
|---|---|---|
| First Payment Date | 05/01/2003 | 04/01/2003 |

CLOSING AGENT DATA SET ISSUES

| FAILED RULE | CLOSING AGENT SYSTEM VALUE |
|---|---|
| Loan origination fee percentage multiplied Principal Balance amount must equal Origination Fee Dollar Amount. | $985.00 |

LENDER/CLOSING AGENT DATA SET COMPARISON

| FAILED RULE | CLOSING DOCUMENT VALUE | CLOSING AGENT SYSTEM VALUE |
|---|---|---|
| HUD-1 'Interest From' date must match the settlement date in Loan Origination System. | 03/10/2003 | 03/09/2003 |

800

FIG. 8 eQC RESULTS

902

ANALYSIS SUMMARY INFORMATION

| | | | |
|---|---|---|---|
| Lender Loan Number: | 123456 | Run Date: | 03/06/2003 |
| MORNETPlus Casefile ID: | 987654321 | Run Time: | 08:17 am |
| Borrower Name: | Homeowner | Issues found? | Yes |
| Property Address: | 123 Main St<br>Anywhere, VA 22222 | | |

910

SUMMARY OF ISSUES FOUND

1. Data used to populate the Lender's closing documents differs from the data used to populate the Closing Agent's documents.
2. Data contained in the Lender's Loan Origination System contained errors.
3. Data used to populate the Lender's closing documents differs from the most current data in the Lender's Loan Origination System.
4. Data used to populate the Closing Agent's documents contained errors.

904

DATA SET USAGE SUMMARY

| DATA SET TYPE | DATA SET VERSION |
|---|---|
| Lender Origination System Dataset | 03/05/2003 10:03 am |
| Lender Closing Document Dataset | 03/04/2003 11:15 am |
| Closing Agent Document Dataset | 03/04/2003 02:30 pm |

906

LOAN CHARACTERISTICS

| | | | |
|---|---|---|---|
| Loan Type: | Conventional | Loan Purpose: | Purchase |
| Amortization Type: | Fixed | Refinance Purpose: | n/a |
| Property State: | Virginia | Loan-to-value: | 95 % |
| Property Type: | Detached | Conforming: | Yes |
| Occupancy: | Owner | Third Party Originated: | No |
| Scheduled Close Date: | 03/10/2003 | | |

908

LENDER DATA SET ISSUES

Data contained in the Lender's Loan Origination System contained errors.
Note: data is only displayed for incorrect values.

| RULE ID | FAILED RULE | LENDER CLOSING DOCUMENT DATASET VALUE | LENDER ORIGINATION SYSTEM DATASET VALUE |
|---|---|---|---|
| | Lender Name must be present | Lender name = (data missing) | |
| | Maturity date must be first day of the month and one month prior to the first payment date. | | Recalculated Value = 05/01/2033<br>System Value = 06/01/2033 |

LENDER DATA SET DIFFERENCES

Data used to populate the Lender's closing documents differs from the most current data in the Lender's Loan Origination System.
Note: data is only displayed where differences between data sets has been found.

| DATA NAME | LENDER CLOSING DOCUMENT DATASET VALUE | LENDER ORIGINATION SYSTEM DATASET VALUE |
|---|---|---|
| First Payment Date | 05/01/2003 | 04/01/2003 |

LENDER/CLOSING AGENT DATA SET DIFFERENCES

Data used to populate the Lender's closing documents differs from the data used to populate the Closing Agent's documents.

Note: data is only displayed where differences between data sets has been found.

| RULE ID | FAILED RULE | LENDER CLOSING DOCUMENT DATASET VALUE | CLOSING AGENT DOCUMENT DATASET VALUE |
|---|---|---|---|
| | HUD-1 'Interest From' date must match the settlement date in Loan Origination System. | Interest From = 03/10/2003 | Interest From = 03/09/2003 |

CLOSING AGENT DATA SET ISSUES

Data used to populate the Closing Agent's documents contained errors.

Note: data is only displayed for incorrect values.

| RULE ID | FAILED RULE | CLOSING AGENT DOCUMENT DATASET VALUE | CLOSING AGENT SYSTEM DATASET VALUE |
|---|---|---|---|
| | Loan origination fee percentage multiplied Principal Balance amount must equal Origination Fee Dollar Amount. | Recalculated value = $985.00<br>System value = $995.00 | |

CLOSING AGENT DATA SET DIFFERENCES

Data used to populate the Closing Agent's closing documents differs from the most current data in the Closing Agent's system.

Note: data is only displayed where differences between data sets has been found.

| DATA NAME | CLOSING AGENT CLOSING DOCUMENT DATASET VALUE | CLOSING AGENT SYSTEM DATASET VALUE |
|---|---|---|
| First Payment Date | 05/01/2003 | 04/01/2003 |

912

REQUESTED CLOSING DOCUMENT MANIFEST

The following documents should be included as part of the final closing package returned by the Closing Agent:

| Document Name | Document Version | Date and Time | # of Pages | Borrower Signature Required? | File Name | Comments |
|---|---|---|---|---|---|---|
| Note | 1.0 | 04/01/2003 10:01 am | 5 | Yes | MultStateNote.doc | One copy |
| HUD-1 | 1.0 | 04/01/2003 10:01 am | 2 | Yes | HUD1.pdf | Two copies |
| Deed | 1.0 | 04/01/2003 10:01 am | 1 | Yes | Deed.doc | Notarize |
| 1003 | 1.0 | 04/01/2003 10:01 am | 4 | Yes | 1003.xml | Two copies |

Fig. 9B

DOCUMENT MANIFEST AND PUBLICATION IN ASSOCIATION WITH DATASET QUALITY CONTROL

CROSS REFERENCE TO RELATED APPLICATIONS

This application is a continuation-in-part of U.S. application Ser. No. 10/405,890, entitled "Electronic Mortgage Quality Control" and filed on Apr. 1, 2003 now abandoned, which is a continuation-in-part of U.S. Application Ser. No. 10,326,570, filed Dec. 20, 2002 and entitled "Certification for Expedited Mortgage Sales," which claims the benefit of U.S. Provisional Application No. 60/369,030, filed Apr. 1, 2002 and entitled "System, Specification & Tools for Creating Processing, and Validating Electronic Documents". The entire contents of these applications are hereby incorporated by reference.

BACKGROUND OF THE INVENTION

1. Field of the Invention

This invention relates generally to data processing, and more particularly to a manifest and publication functionality applied in conjunction with the review of electronic datasets.

2. Description of the Related Art

Borrowers often use lenders to finance real estate transactions in the primary mortgage market. A mortgage loan closing may involve a property sale, or a refinancing of an owned property. Where there is a property sale, a typical mortgage loan closing can involve a buyer, seller, and lender. The lender loans funds to the buyer, and disburses them to the seller to complete the transaction. The buyer signs a promissory note (also referred to as a mortgage note) that obligates the buyer to repay the loaned funds. The buyer is thus often referred to as the borrower in the mortgage loan closing transaction.

Lenders sell mortgages to investors in what is known as the secondary mortgage market. Examples of investors include government sponsored entities (GSEs) such as Fannie Mae, Freddie Mac, and Ginnie Mae. Investors also include commercial banks, community banks, savings and loan associations, and others. Some of these entities participate as both lenders and investors at various times. That is, they both sell and purchase portfolios of mortgages. Similar mortgages are also often pooled together and used to as security for investment instruments referred to as mortgage-backed securities.

A problem with the sale of loans in a secondary market is the lag time between the original acquisition of the mortgage by the lender (e.g., at the closing) and the sale of the mortgage to the investor.

Electronic documents are being introduced for mortgage transactions. Use of these documents can be beneficial to participants in such markets because they can reduce the amount of physical error checking that is often required for paper documents, as well as the number of opportunities for creating discrepancies and errors among and between the various forms used by different participants. However, even where a lender uses electronic documents, a typical closing will still often implement traditional paper based practices, wherein borrowers sign standard paper forms using pen and ink (also referred to as "wet" signing in the industry). Where such a mortgage is later sold to a secondary market investor, since traditional paper forms are used, traditional delays in providing funds to lenders pursuant to the mortgage purchase by the investor have remained.

Another problem with transactions in the secondary mortgage (and other) markets is that investors often have complicated requirements for purchasing loans. Lenders often use experienced analysts to try to ensure that loans will meet these complicated requirements before they agree to lend the money to the borrower. Sometimes, analysts make mistakes and loans are later found not to be marketable to the investor. The loan then likely becomes what is referred to as a "scratch & dent" loan that is sold at substantially discounted rates as compared to what the lender would have gotten from the investor. Moreover, a loan may be subject to repurchase obligations if the investor finds it to be deficient after purchase. There the lender would have to repurchase the loan, and then market it as a scratch & dent loan, incurring losses from the sale of the loan as well as additional marketing expenses.

Another problem with electronic documents is that there are various different systems to which a document will need to integrate. Even where all of the parties to a transaction, and parties to related transactions use the same electronic document format, there are still often discrepancies among and between the variously defined documents.

Still another problem with electronic documents relates to determination of the appropriate documents to be used for a particular transaction, and assurance that the transaction and related transactions implement the correct version of such documents. With real estate closing transactions, a wide variety of documents may be required for inclusion in a proper closing package, depending upon factors such as the type of loan product and the governing State. Even where traditional paper closings are implemented, the determination of the elements in a closing package is often made ad hoc, based upon the experience of the closing agent or other party. Some document origination systems include a facility for printing documents, and thus at some point may provide a list of documents to be printed pursuant to a transaction. However, such lists are not designed for recovery after the transaction takes place, and are also not designed for post-printing association with the printed documents.

What is needed is a quality control system that overcomes the problems of conventional systems.

SUMMARY OF THE INVENTION

The present invention includes aspects that provide greater predictability in terms of marketability of electronic documents following anticipated transactions, accommodate consistency among the various documents connected to a given transaction, and expedite sales of mortgage loans involving electronic mortgage documents even where traditional pen and ink signing is used pursuant to closings.

The present invention may be provided in the context of an electronic mortgage document quality control system. For example, a quality control process may be applied to electronic mortgage documents corresponding to loans that are candidates for sale on the secondary mortgage market. A quality control system manages numerous potential rule sets. A rule set particular to a transaction type includes rules that, when satisfied, verify that the electronic mortgage document is appropriate for the transaction type. A lender can thus, for example, subject a candidate electronic mortgage document to the quality control process and receive confirmation that the corresponding loan can subsequently be sold to an investor prior to originating the loan.

The rules also allow the generation of reports that are tailored to potential problems with electronic mortgage documents. This allows the lender to correct errors or omissions, and thus modify the electronic mortgage document so that it will be known to be marketable. Although one embodiment of this process applies to secondary mortgage market transactions, it is also applicable to transactions other than sales on the secondary mortgage market.

According to one aspect of the present invention, a document manifest is provided in connection with quality control results and corresponding reports. The document manifest lists documents that are related to (and, depending upon the party, required for) a particular transaction, such as a real estate closing. The list may also be provided in association with a document publication feature that is provided according to another aspect of the present invention. The document publication aspect allows assurance that quality control procedures are applied to the electronic mortgage dataset used to produce documents that are published for a transaction (e.g., a closing). This aspect allows a party (e.g., closing agent) to ensure proper publication of documents, and parties engaging in post-closing activities to do the same.

The document manifest aspect of the present invention may be provided as a computer-implemented method that involves accessing an electronic mortgage dataset corresponding to a request for a computer implemented quality control check in connection with a particular real estate transaction; identifying a plurality of documents that are required for the particular real estate transaction in association with the request; verifying that the electronic mortgage dataset is sufficient to accurately provide the plurality of documents; and providing a list of the plurality of documents that is verifiably connected to the electronic mortgage dataset, whereby correct versions of the plurality of documents may be published pursuant to a completion of the particular real estate transaction and independently obtained for additional real estate transactions that follow the particular real estate transaction. It may alternatively be provided as software, computer program products, systems, and the like that provide such a functionality.

As indicated, the document publication process is provided in connection with the quality control. A publication value such as "Printed" is associated with electronic mortgage datasets to indicate whether a corresponding package of documents has been readied (e.g., quality control checked and printed) for a transaction such as a closing. The publication process also may incorporate versioning. When a given package of documents is published, it is preferably versioned incrementally. Additionally, each document that is printed pursuant to publication includes some kind of indication of the package version number. This allows the documents in the package to be collectively managed, while also ensuring accuracy and integrity of the underlying data.

The present invention can be embodied in various forms, including computer implemented methods, computer program products, computer systems and networks, user interfaces, application programming interfaces, and the like.

BRIEF DESCRIPTION OF THE DRAWINGS

These and other more detailed and specific features of the present invention are more fully disclosed in the following specification, reference being had to the accompanying drawings, in which:

FIGS. 6A-B illustrate an example of a format for an electronic document.

FIG. 8 is a display diagram illustrating an example of an EQC results report.

FIGS. 9A-B are display diagrams illustrating another example of an EQC results report that includes a document manifest.

DETAILED DESCRIPTION OF THE INVENTION

In the following description, for purposes of explanation, numerous details are set forth, such as flowcharts and system configurations, in order to provide an understanding of one or more embodiments of the present invention. However, it is and will be apparent to one skilled in the art that these specific details are not required in order to practice the present invention.

Figure 1A:
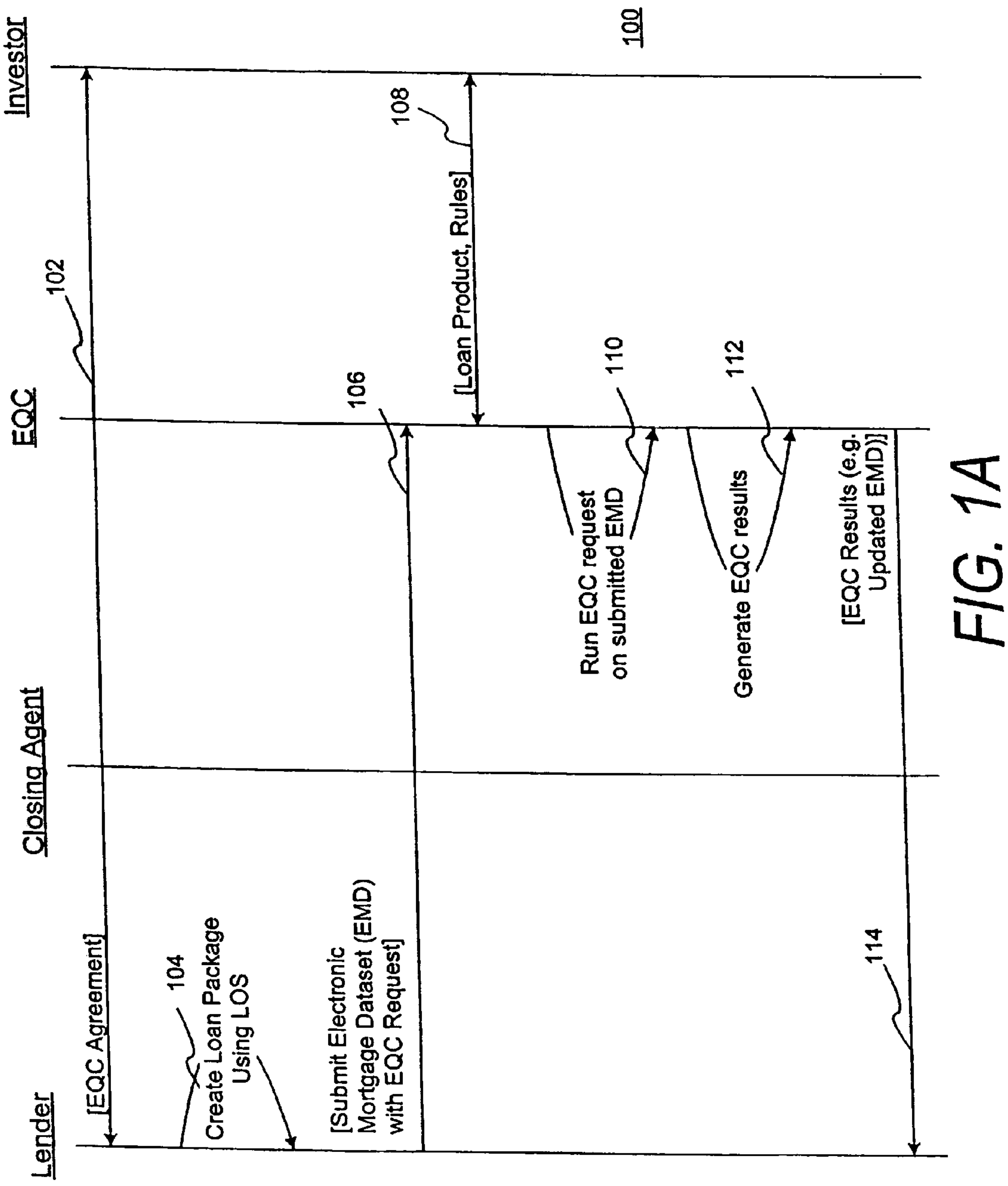
FIGS. 1A-B are event diagrams illustrating an embodiment of quality control.
Figure 1B:
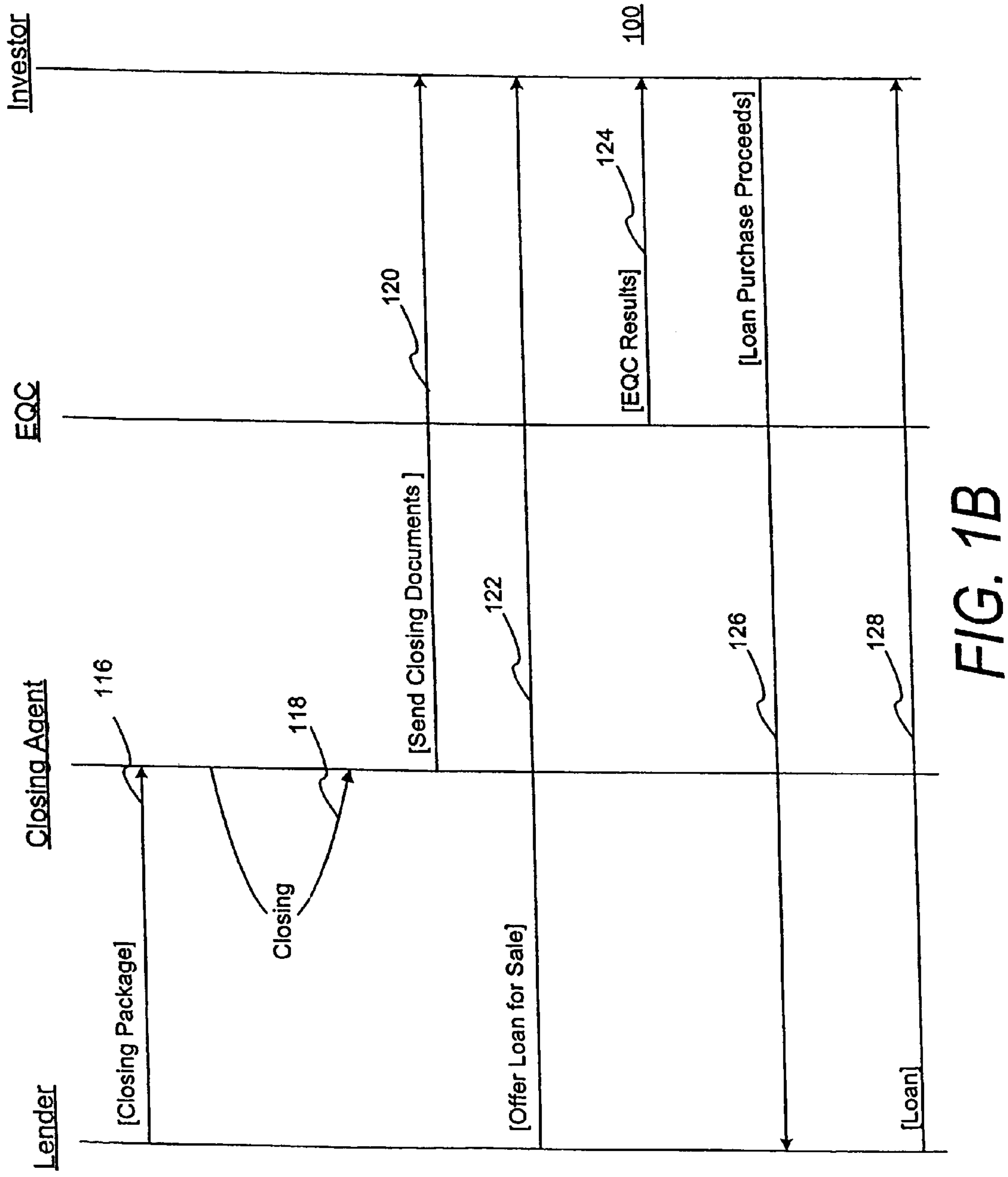

FIGS. 1A-B are event diagrams illustrating an embodiment of an electronic mortgage quality control ("EQC") based transaction 100. The illustrated participants in the transaction 100 include a lender, closing agent, EQC system provider, and investor.

Although participants are shown separately, at times the roles of multiple participants may merge. For example, the investor may provide a mortgage services platform, and within that context provide EQC functions that can be referred to as an EQC system.

The EQC system variously offers business predictability to participants. Features provided by the EQC system include determinations whether electronic data sets are sufficient to support a particular transaction, and whether data sets of multiple parties participating in a given transaction are consistent and accurate. Although the EQC system is applicable to any transaction, for ease of description it is detailed in connection with the sale of a mortgage loan from a lender to an investor in the secondary mortgage market. In that regard, the EQC system includes rules that are used to determine whether electronic data corresponding to the loan is accurate includes the necessary elements to support such a transaction.

The rules provided by the EQC system can be thought of as falling within multiple categories. The first can be referred to as a "core set" that is required to generally support a given transaction. For example, industry standards that govern the sale of loans from any lender to any investor in the secondary mortgage market dictate the constitution of a core set of rules for that type of transaction. The additional categories are respectively party driven. For example, a particular investor may contribute rules beyond the industry standard, and a particular lender may have an even more stringent review process than the investor, and thus desire still further rules. The EQC system is arranged to variously accommodate rule contributions. For example, the EQC system may include the core set of rules by default, and include mechanisms for allowing participants to submit additional rules.

An agreement 102 between the lender and the investor, wherein the investor promises to buy EQC compliant mortgage loans from the lender in exchange for the lender's successfully invoking the EQC system, allows the sale of such mortgage loans without requiring the lender to make certain representations and warranties concerning the marketability of particular loan products in the secondary mortgage market. Successfully invoking the EQC system refers to submitting the electronic mortgage data set to be used for the loan, and receiving a "pass" indication regarding that data. A pass indication means that the data has satisfied all of the conditions found in the rules applied to the data by the EQC system. Where all of those conditions are satisfied, it can be said that the EQC system produces no "findings" based upon application of those rules. Preferably, the waived representations and warranties include those pertaining to whether the mortgage loan (i.e., the promissory note) sold by the lender to the investor is a legally enforceable asset. This allows the lender to avoid repurchase obligations should the loan be to be found deficient after the secondary market sale. Although this representation will be waived, the lender will still be required to make other representations, such as those involving appraisal of the property and credit worthiness of the borrower.

The agreement aspect is optional. Even if the agreement is not implemented, the lender can implement the EQC system to assist in the preparation of loan packages that include all necessary components for marketability. Initially, the lender creates 104 the loan package, usually based upon interactions with a borrower who is either purchasing or refinancing a property. The lender often uses a loan originating system (LOS) to prepare the package. The closing package for a loan includes a note, a security instrument, RESPA required documents, and other documents.

Lenders have various systems for generating loan packages, some of which do not implement their own LOS. For example, the lender may originate a mortgage and create the necessary documents in conjunction with a service provider's electronic mortgage system, such as the MORNETPlus® 2000 system, which implements Desktop Underwriter®, Desktop Originator®, and MORNETPlus Connections, all provided by Fannie Mae. In particular, the Desktop Underwriter® works with various conventional LOS systems to allow lenders to originate mortgages and create documents such as loan applications. Other pertinent documents can also be created by independently using an LOS, or through MORNETPlus Connections. There are various alternatives, including but not limited to those working with the Freddie Mac Loan Prospector®, third party document preparation software, and others.

Preparation of the loan package results in the creation of an electronic mortgage data set ("EMD"). The EMD may be variously embodied. For example, the EMD may be a lender dataset that is applicable to the loan package, and is used to create corresponding documents. The EMD may also be provided as an Extensible Markup Language (XML) based file containing previously defined elements and attributes, and corresponding values.

In another alternative, the EMD may be a formal electronic mortgage document. Although aspects of the present invention are applicable to any data set, an example of a format for a formal electronic mortgage document is described further below, with reference to FIGS. 3 and 6A-B. Additionally, regardless of how it is embodied, the EMD may later be represented in paper form where the EMD is used to create paper documents, if applicable.

Preferably, the EQC request and EMD are sent together to the EQC system, for application of the request to the EMD. There, the EQC request and EMD can be commonly transmitted but separately packaged. Alternatively, particularly where a formal document definition is applied, the EQC request and the EMD can be packaged together. In another alternative, the EMD may already reside with the EQC system, or be provided by another party (e.g., a closing agent), with the EQC request being independently provided to the system.

With the EQC request functionality, lenders (or others, e.g., closing agents, title cos., appraisers, etc.) send their data to the EQC system, where the EQC rules are applied to the data, and corresponding results file is returned to the requestor.

The EQC system maintains rules to be applied to EMDs in a database. Each loan product will preferably have a rule set tailored to the product. For example, an investor has requirements for a particular loan product that are reflected in the rule set for that loan product. These rules vary in complexity, from those that merely ensure the presence of predetermined fields in the EMD, to those having more complicated logic. Detailed examples of rule sets are described in connection with FIG. 5, below.

After receipt of the EQC request, the EQC System runs 110 an EQC Request functionality against the submitted EMD. For loan products, this entails identifying the product, retrieving the appropriate rule set for the loan product from its rules database, and applying the rules to the loan product. Preliminary validation, such as XML validation against a DTD for the EMD, may also be applied prior to application of the rules, as described further below. The format of the EQC request will vary, but an example of an EQC format is described further below.

The EQC System then generates 112 results corresponding to the request. Preferably, the results are recorded in the form of a report. The EQC results can be variously provided to one or more recipients. Three example modes include asynchronous, synchronous, and postback. In the asynchronous mode, the results are retained by the EQC system and are associated with a report identifier (e.g., a GUID). The report identifier is later used to retrieve the EQC results. For example, the lender may provide the identifier to the investor, who may then use the identifier to make their own EQC request, which returns the same results. In the synchronous mode, the EQC results are returned in association with the EQC request. In the postback mode, the EQC results are simply posted to a web server corresponding to an URL submitted with the request. FIG. 1A illustrates a potential application of a synchronous mode wherein the lender receives 114 EQC results corresponding to its submitted 106 EQC request.

FIG. 8 is a display diagram illustrating an example of an EQC results report 800. The report 800 includes an Analysis Summary Information section 802, an EMD Summary section 804, a Loan Characteristics section 806, and a Findings section 808. The Analysis Summary Information section 802 contains basic information to identify the underlying loan, identify the date and time that the EQC request was run (e.g., to distinguish the report from other EQC reports for the same loan and/or EMDs), and whether any issues were found in the particular EQC run.

The EMD summary section 804 identifies the EMDs to which the EQC request and report apply. Preferably, each EMD submitted to the EQC system is associated with a uniquely identified so that the data can later be correlated to EQC results. An example for such an identifier is a date/time stamp for the EMD. The date/time stamp can variously originate. Where the EMD is a data set coming from an LOS or other party system, the date/time can correlate to a time when a corresponding file is entered or saved into the system. Where the EMD is XML data, a time stamp correlating to the file containing the XML data can have the date/time stamp.

Alternatively, an element or attribute in the XML data can define a value (such as date/time) that is used to identify such an EMD. Where the EMD is a formal electronic document, a field in the electronic document (which itself may be an XML element or attribute) can contain the date/time stamp value. Still further, an EMD (formal or informal) can be a file containing a time/date stamp, to which a tamper-evident seal is applied. A "seal" wrapping an electronic document that is created by a digital signature. The seal can be verified to ensure that no changes have been made to the EMD since the seal was put in place.

The Loan Characteristics section 806 contains information that provides further information about the loan, preferably a basic overview of characteristics that are believed to be of value to the reader of the report. Finally, the Findings section 808 contains details about issues that are found by application of the relevant rules to the subject EMD. If no issues are found, this may merely indicate "no issues", or "EQC pass", or "no findings" or any other indication of those type of results.

As indicated, the EQC results in this example pertain to the following EMDs: LOS data, Closing Agent (CA) Data, and an electronic closing document. Accordingly, the illustrated Findings section 808 includes Lender Data Set Issues, Lender Data Set Comparison Issues, Closing Agent Data Set Issues and Lender/Closing Agent Data Set Comparison Issues. The "comparison" issues pertain to consistency of data among various sources (e.g., closing document to EMD, or EMD to EMD). The remaining issues pertain to rules that examine EMDs for the presence of certain information. More examples of rules are described further in the tables below.

FIGS. 9A-B are display diagrams illustrating another example of an EQC results report 900*a-b* that includes a document manifest. This example of an EQC results report 900*a-b* may be used in connection with the document publication process of the present invention. The report 900*a-b* includes an Analysis Summary Information section 902, an EMD Summary section 904, a Loan Characteristics section 906, a Findings section 908*a-b*, an Issues Summary section 910, and a Document Manifest Section 912.

The Analysis Summary Information section 902, EMD Summary section 904, Loan Characteristics section 906 and Findings section 908*a-b* respectively include the same information as was described for the commonly named sections (802-808) in the example of FIG. 8.

This EQC results report 900*a-b* adds the Issues Summary section 910 and the Document Manifest section 912. The Issues Summary section 910 includes a general description of the issues that were discovered in connection with the processing of an EQC request corresponding to an electronic mortgage dataset. In addition to corresponding to the particular entries found in the Findings section, 908*a-b*, this particular example of the Issues Summary section 910 includes entries relevant to the information in the Document Manifest section 912, as well as the document publication process that is described further below. Generally, the EQC process that implements the document publication in accordance with the present invention ensures that the closing documents that are published in connection with a closing are based upon a dataset that is current, consistent with other relevant datasets, and reviewed for error.

The Issues Summary section 910 allows the user to quickly review the categories of issues found without requiring review of the detailed information found in the Findings section 908*a-b*. The Issues Summary section 910 is generally organized according to the categorization of the underlying rule sets that are used to check submissions and generate EQC results as described further below.

The five categories that are preferably implemented in embodiments using the document publication feature are as follows.

The first category of issues is comparison of lender and closing agent data. When these issues exist, the following text will appear in the Issues Summary section 910: "1. Data used to populate the Lender's printed documents differs from the data used to populate the Closing Agent's printed documents."

The second category of issues is errors in the lender's data set. When these issues exist, the following text will appear in the Issues Summary section 910: "2. Data contained in the Lender's Loan Origination System contained errors."

The third category of issues is differences between a lender's system and printed documents data sets. When these issues exist, the following text will appear in the Issues Summary section 910: "3. Data used to populate Lender's printed documents differs from the most current data in the Lender's Loan Origination System.

The forth category of issues is errors in the closing agent's data set. When these issues exist, the following text will appear in the Issues Summary section 910: "4. Data used to populate the Closing Agent's printed documents contained errors."

Finally, the fifth category of issues is differences between a closing agent's system and printed documents data sets. When these issues exist, the following text will appear in the Issues Summary section 910: "5. Data used to populate Closing Agent's printed documents differs from the most current data in the Closing Agent's System."

The Document Manifest section 912 includes a listing of those documents that should be included as part of the final closing package used by the Closing Agent. The listing may be used by the Closing Agent to ensure that all of the correct documents are published pursuant to a closing.

The Document Manifest section 912 may also be used by any party engaging in a post-closing activity that relates to the closing, to either confirm that all of the correct documents were published for the closing, or to ensure that the correct documents are being used for the relevant post-closing activity. The related transaction may, for example, be taking custody of, recording, reviewing, or engaging in any process related to one or more of the documents in the closing package. In any event, the connection to the EQC results allows confirmation of the adequacy and accuracy of the data contained in the documents.

Preferably, the Document Manifest section 912 provides a listing of the documents corresponding to the closing package, such as the rows in the table in EQC results report 900*b*. Columns corresponding to the document name, document version, date/time, # of pages, borrower signature required, file name, and comments may also be provided. The document version field is described further in connection with the document publication aspect of the present invention below. Preferably, the "document version" in this field corresponds to a version number that is tied to publication of the documents in the closing package. In that instance the column could also be called "publication version" if desired. The version number is also preferably represented in the indicator that is provided on displayable (e.g., printed) versions of the published documents, which helps users to ensure that printed documents correspond to the document manifest and thereby the applied quality control processes.

The document manifest may be provided as desired by the parties in a transaction. Alternative examples of the document manifest may contain more, fewer, or different entries from those in the illustrated example.

The remaining information in the Document Manifest section 912 is useful for ensuring that all of the pages of a document are present, that the proper number of copies are provided, and other information useful for locating and identifying corresponding files, as well as the date/time stamp corresponding to the published version.

Regardless of the mode and content, the report can be put in various formats. However, one preferred report uses a formal electronic document format. As described further below, this type of document includes main data and view sections, with the main data section containing results information, and the view section containing presentation formatting for rendering the printed or viewed report (e.g., FIG. 8). A header section containing fields identifying the document as an EQC results document, and other criteria, is also included.

With the provision of the EQC results, the lender (or other party) has immediately verifiable indication of compliance with the rule set(s) corresponding to the EQC request, or indication of what needs to be done to gain compliance. This, for example, allows a particular lender to revise an EMD so that it complies with the expectations of a particular investor, prior to closing the loan. The lender can remedy the faults identified in the report and then resubmit the modified package to again seek an indication that the loan will be transferable. These features afford a level of business predictability that is completely absent from conventional systems.

Once the lender has submitted an EQC request and is satisfied with the report (and has verified completion of any other necessary preconditions, such as appraisal and title search), the lender sends 116 the closing package to the closing agent in preparation for the closing. The closing package can be sent using conventional mechanisms, including but not limited to regular postal service, express mail services, electronic mail, electronic data transfer, or other any other form of communication.

The closing 118 is also a conventional paper or electronic closing. In the paper closing, the closing agent obtains closing documents by receiving them in paper form from the lender, or by printing them based on a formal electronic document or other data set, or through other means. In the electronic version, the relevant parties electronically sign the corresponding electronic mortgage documents. The closing is completed by having the documents reviewed and executed by relevant parties, such as the borrowers. The executed documents include, among others, the mortgage note. At this (or some prior) time, the closing agent may wish to check the closing agent data set for the closing to ensure that it is consistent with the actual closing data in the closing package, and to apply any additional closing agent specific rules to the same.

Once all of the loan documents are executed, they are sent 120 to lender and/or the investor, again using conventional means for sending paper or electronic documents. The electronic closing package may be variously embodied. For example, a single "electronic document" containing views corresponding to the different paper documents could be provided, or an archive file format, such as a conventional Java™ JAR file, or a ZIP file could contain multiple electronic documents respectively corresponding to the different required documents can be provided.

As indicated in FIG. 1B, at some point the lender offers 122 the loan to the investor. Although this process is shown to occur after the closing, it may also occur before the closing. Various conventional formats and protocols for offering to sell the loan to the investor may be used, such as Funding Express® and/or MORENET as provided by Fannie Mae. The lender and the loan have pertinent data that are used to connect the sending of funds to a lender pursuant to a particular purchase.

Although sending 124 the EQC results is shown to occur after the closing, the investor may be variously made aware of the EQC results. As described, the EQC results can be posted to the investor when the EQC request is made by the lender prior to the closing. Alternatively, a report retained by the lender can be sent to the investor, or the investor may independently make an EQC request and thereby receive the results. Still further, the report may actually be sent to other parties, such as a third party reviewer of the results.

After conventional review processes (or the certification process described in connection with FIGS. 2A-B), the purchase proceeds are sent 126 to the lender. Sending purchase proceeds, also referred to as the release of funds to the lender for the loan purchase, can use established funding protocols. Funding options include processes that provide the lender with early payment for a loan to be sold to an investor. Funds are typically sent to the lender in advance of pooling or pool settlement date (and a fee charged to the lender), subject to established credit limits. Once the lender determines the final disposition of the loan (e.g., to be sold as Cash or MBS—tied to a specific commitment/forward sale) the loan is delivered 128 to the investor—at which point the investor will "settle up"—any additional monies due from the lender based on the early funding plus the fee component. Alternatively, with a direct sale, documents are typically received and validated by either investor's custodial function or a 3*rd* party custodian. There is no "settle up" period because the price and delivery has already been established.

Figure 2A:
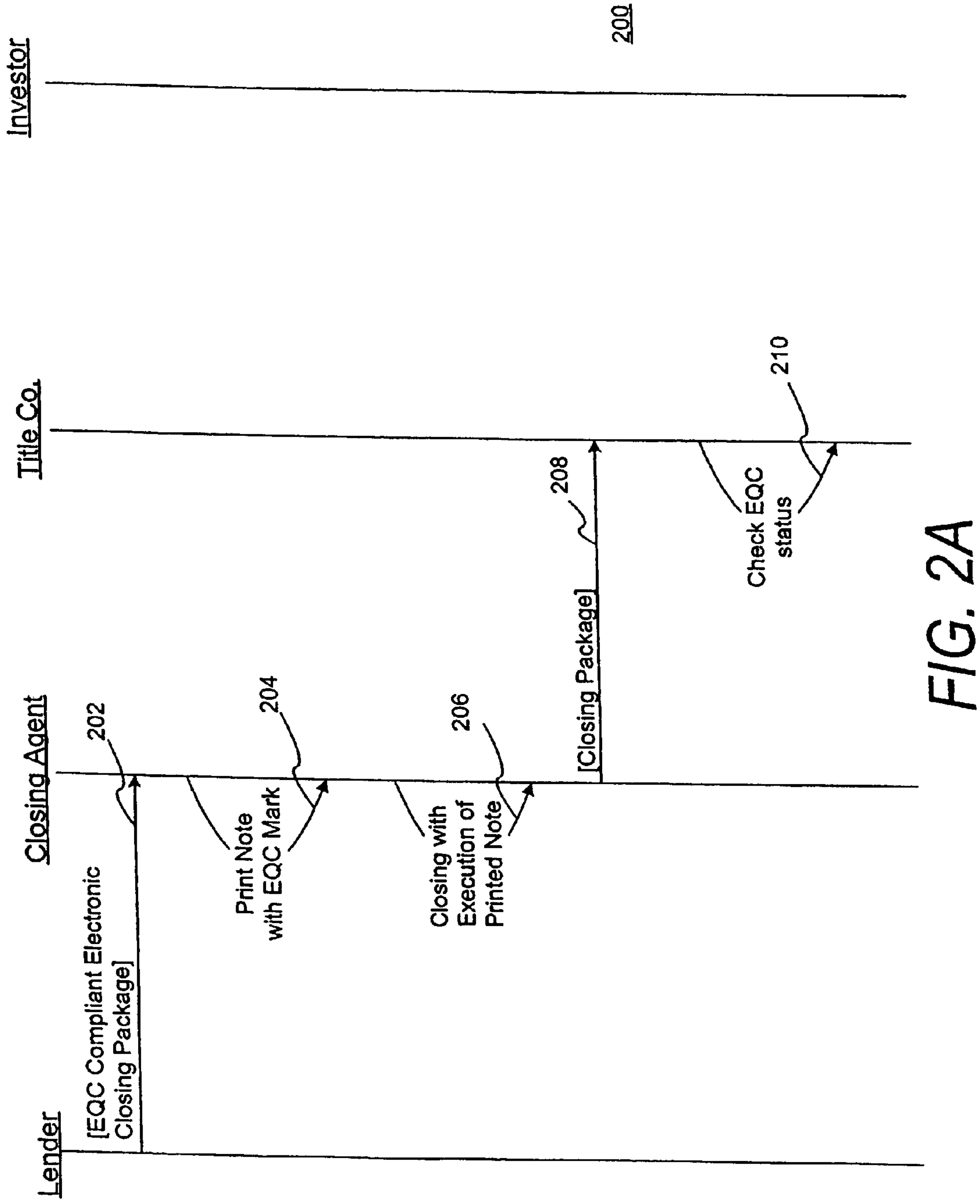
FIGS. 2A-B are event diagrams illustrating an embodiment of quality control procedures in support of the expedited sale of mortgage loans.
Figure 2B:
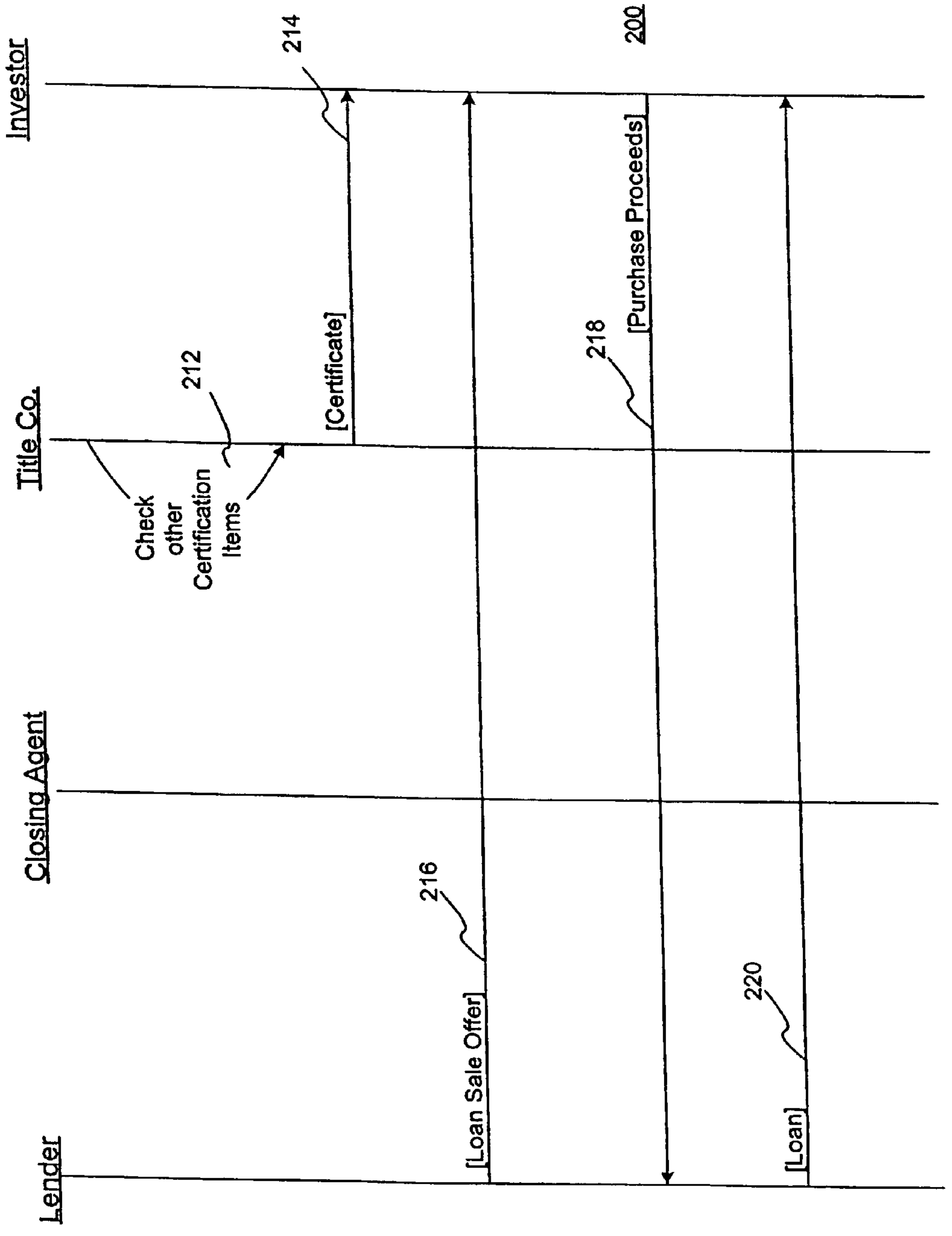

FIGS. 2A-B are event diagrams illustrating an embodiment of quality control procedures in support of the expedited sale of mortgage loans. Here, the features of predictability, data integrity verification, and efficiency described above in connection with the EQC System are integrated with a conventional closing involving pen and ink signing of paper closing documents, for expedited funding pursuant to the purchase of loans by an investor. This is accomplished by running an EQC request on a formal electronic document, and providing EQC results that are evident both in relation to the electronic document and the printed versions of documents created from the electronic document. In one embodiment, the electronic document is updated to reflect the EQC results, and this update will include information that causes the corresponding printed documents to contain a unique mark that corresponds to the EQC results. This allows parties to later rely upon the EQC results for integrity and completeness of the data in the electronic document, as described above, and to rely upon the unique mark on the executed, printed document actually used in the closing to verifiably associate the document to the EQC results. For example, an investor may receive the EQC results and the electronic document for a loan, identify the executed paper documents from the closing as associated with those EQC results and electronic document, and rely on the same in releasing funds pursuant to a purchase of the loan.

Referring to FIG. 2A, after the front-end procedures of creating electronic loan documents, an EQC request is made. Here, in addition to providing an EQC results report, the electronic documents are updated to reflect the same. Preferably, part of this update is modifying the electronic document to cause the electronic document to produce a printed document having a unique mark corresponding to the EQC result. One preferred marking is the previously described date/time stamp. Alternative markings, such as a uniquely created identifier that is generated by the EQC system and applied to the EMD that is later used to create prints, can also be used.

Again, this may be an iterative process wherein the lender remedies any errors found during each EQC request, with the electronic document being modified upon receipt of a satisfactory result. Under those conditions, each iteration would include a new date/time stamp.

An electronic closing package that has been reviewed and updated according to this process may be referred to as an EQC compliant electronic closing package. The lender sends 202 the closing package to the closing agent prior to the closing, and after any other necessary conditions (e.g., title search, appraisal, etc.) are completed.

The closing agent then prints 204 the necessary documents for the closing using the information in the electronic closing package. Alternatively, the lender may have done the same, and thus will have sent the materials to the closing agent already in paper form. Regardless, all necessary documents, such as the note, will contain a mark connecting the printed document to the EQC compliant electronic closing package. The mark may be evidenced anywhere on the documents, such as in the footer.

The closing agent then conducts a conventional closing 206, wherein the documents are reviewed and executed by relevant parties, such as the borrowers. As indicated, the executed documents include the note.

The executed closing documents and the electronic closing package are sent 208 to a certifying agent. The certifying agent then verifies that the executed documents correspond to the electronic closing package, and performs additional certifications, as follows. First, the certifying agent checks 210 the EQC status of the electronic closing package. Preferably, this includes referring to the EQC results already associated with the electronic closing package. The certifying agent also determines whether the executed paper corresponds to the electronic closing package and the EQC results by verifying that the paper contains the unique mark. Checking 210 the EQC status may also include making another post closing EQC request, although others such as the investor may alternatively perform this task.

Once it has been verified that the electronic closing package, the signed paper document, and the EQC results are all commonly connected, that certifying agent checks 212 the executed closing package in order to make additional certifications. The certifying agent then issues 214 a certificate that represents that the executed note corresponds to the EQC results, in addition to one or more of the following representations: that the printed documents were signed properly pursuant to the closing; that funds were properly disbursed (typically to the borrower); and that a particular note format was used (e.g., for the State or product). The certificate may also be issued in relation to a contract among the lender, investor and certifying agent, or, alternatively, an electronic surety policy covering the above-described representations and warranties, with the investor being designated as a beneficiary the policy along with the lender. The certificate may be variously sent to the investor (and the lender) such as by e-mailing an Adobe Acrobat® PDF file.

The electronic closing package is also sent to the investor. This allows the investor to run a post closing EQC check, if desired. The investor can also review the certificate and perform any additional in-house data comparisons prior to sending 218 funds to the lender pursuant to its purchase of the loan. The sequences for offering 216, funding 218, and receiving 220 the loan are described above in connection with FIGS. 1A-B. The investor relies on the certificate to provide funds to the lender without traditional delays involved in selling mortgages in the secondary market. Normally, the investor would not immediately send funds to a lender pursuant to the purchase of a loan, without additional steps such as the review of the executed closing documents by a title company or other third party, and provision of corresponding representations and warranties by the lender. By contrast, EQC system participation allows the lender and investor to proceed with the sale without such representations and warranties, and allows them to do so without requiring traditional document review to ensure the completeness and correctness of the loan data in the closing documents.

Figure 3:
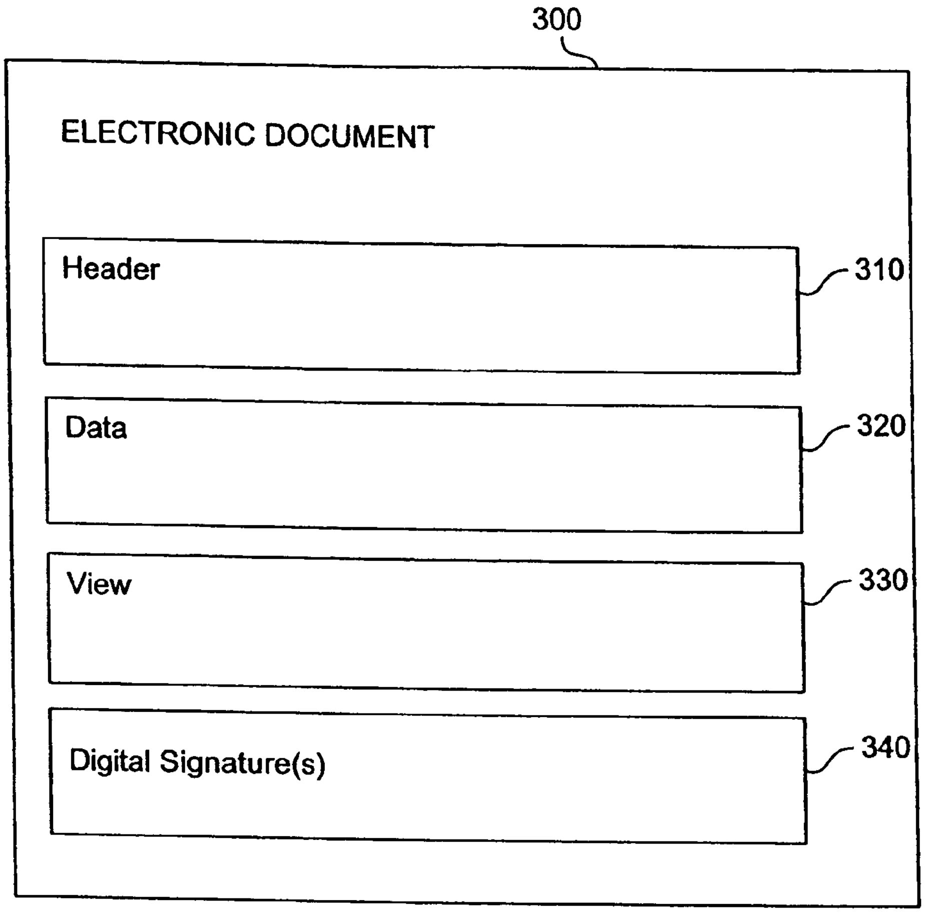
FIG. 3 is a block diagram illustrating an example of an electronic document architecture.

Before moving to further description of the operations of the EQC system, it is helpful to review an example of an electronic document format. FIG. 3 is a block diagram illustrating components of an electronic document usable in conjunction with embodiments of quality control in accordance with the present invention, although various other electronic document types and formats may also be used. The electronic document 300 includes a header section 310, a data section 320, and a view section 330. The electronic document 300 may also include a signature section 340 as part of its format; however, the signature section might not be used where paper closing documents are used, or the signature section 340 may merely indicate that paper documents were used and signed, in lieu of maintaining an electronic signature.

The electronic document 300 is preferably defined using a mark-up language. The electronic document 300 may be structurally altered depending upon the processing environment. For example, it may become desirable to strip one or more of header 310, data 320, view 330 and signature 340 sections from the electronic document 300 to facilitate processing, display, transmission, or for intended use. Particularly, an electronic document that is only intended for machine processing may at times only include the header and data sections 310, 320, or an electronic document that is only intended for viewing may not contain a data section 320 (e.g., a billing statement emailed to a client).

The header section 310 contains information about the document itself, such as its version, the type of document (e.g., that the document is a mortgage note, trial transcript, etc.) and whether or not all parties have signed. The data section 320 contains the information corresponding to that originating from an equivalent paper document, such as data from a mortgage note. The view section 330 contains tags that describe how to format and present the data contained in the document. For example, the view section 330 contains tags that describe how to format and present a printed mortgage note.

The header and data sections 310, 320 are preferably written in extensible markup language (XML) and the view section 330 is preferably written in extensible hypertext markup language (XHTML), which are conventional languages for creating electronic documents, although various alternative languages may be utilized. The names of the tags and the structure of XML documents are defined by a document type definition (DTD). The DTD associated with a particular electronic document describes the tags or markup and the structure of the document, and specifies which tags contain other tags. Conventional XML and XHTML programming techniques can be used to create the tags particular to content and format required by industry standards or the like.

The data section 320 can be organized using elements as well. For example, it may be generally demarcated by a "DATA" element that is subdivided into MAIN and MAP elements, with the MAIN element containing the XML structural description of the data model for the particular electronic mortgage document. For example, the MAIN element might incorporate LOAN (the terms and features of the loan, e.g., the interest rate and loan amount), BORROWER (information about the borrower), LENDER (information about the lender), PROPERTY (information about the property which is the subject of the mortgage), and EXECUTION (information about the date and location of the execution of the note) elements.

The MAP element generally links fields in the data section 320 to presentation fields in the view section 330. An electronic document may include more than one "view," so there may be a MAP element for each view that a DATA element is linked to. For example, if an electronic document contained three different view sections representing the data from a single data section, there would be three corresponding MAP elements within the DATA element.

The linking provided by the MAP element is preferably provided by elements that link values in the view section 330 to corresponding ones in the data section 320. There are various ways that a linking element can reference the necessary values, such as by including a pointer to a field in the data section 320 (e.g., in an attribute) and a pointer to a field in the view section 330 (e.g., in another attribute). Conversion elements may be associated with or contained by linking elements, to accommodate differences in format between the data and view sections.

FIGS. 6A-B illustrate an example of a listing 600 for an electronic document structurally configured according to the architecture of FIG. 3. This listing is not exhaustive, but is merely provided to illustrate where various data would be found within a so-configured electronic document. The listing 600 includes a header section 620, a data section 630 containing a main data section 660 and map section 670, a view section 640, and a signature section 650. The function of each of these sections is described in connection with the corresponding elements of FIG. 3. As is evident from the example MAIN section 660, fields and corresponding values are found therein, such as the illustrated MORTGAGE_TERMS InterestRatePercent which is shown to have the value "6". The electronic data set can be found in whole or in part in this MAN section of the electronic document. That is, the fields and corresponding values that comprise the electronic data set to be examined by the EQC system are defined in this section. The view section 640 is used to produce printed and displayed versions of documents. Additionally, confirmation that fields and corresponding values in the main data section 660 match those in the view section 640 can be provided by using the ARC elements found in the MAP section 670. Each ARC element contains references to the fields and corresponding values. For example, as described, the main data section 660 identifies the InterestRatePercent to have the value "6". Similarly, the view section 640 provides a value "6" for the InterestRate field. The first ARC element found in the map section 670 associates these fields and values. During a validation of the electronic document, this ARC element is used to verify that the main data matches the view data for the interest rate field. As indicated, the listing provided in FIGS. 6A-B is not exhaustive, nor is this the only type of data set to which the EQC system functionality is applied.

Sometimes, the content of an electronic document will be influenced by industry standards and customs. Elements in the EQC rules can be made to comply with the elements defined by these standards and customs, so that the EQC system readily works with the data typically used by industry participants. An example of a format for an electronic document is provided by specifications published by the Mortgage Industry Standards Maintenance Organization (MISMO).

Figure 4A:
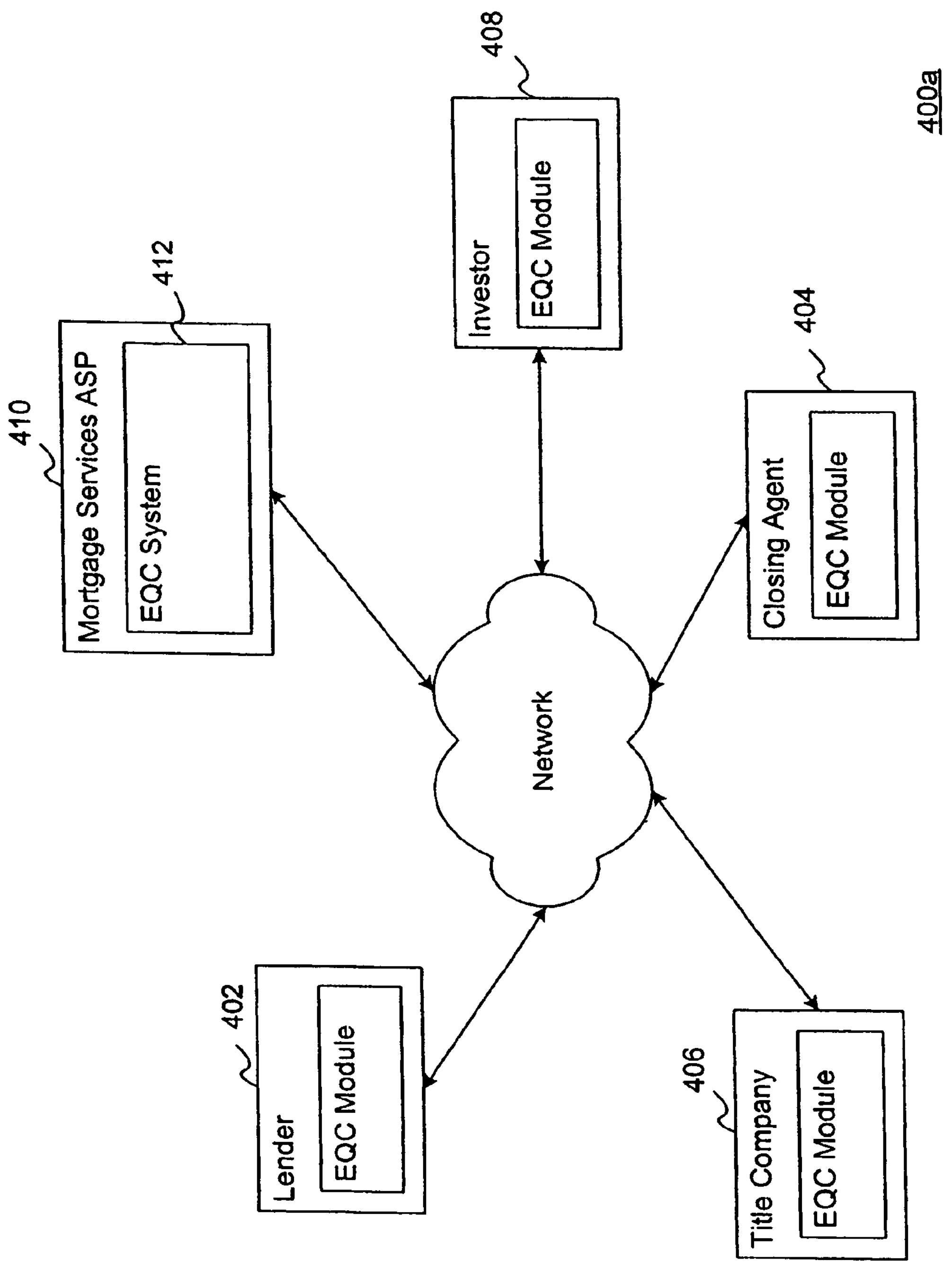
FIGS. 4A-B are schematic diagrams illustrating examples of systems in which EQC systems and corresponding functionality is provided.
Figure 4B:
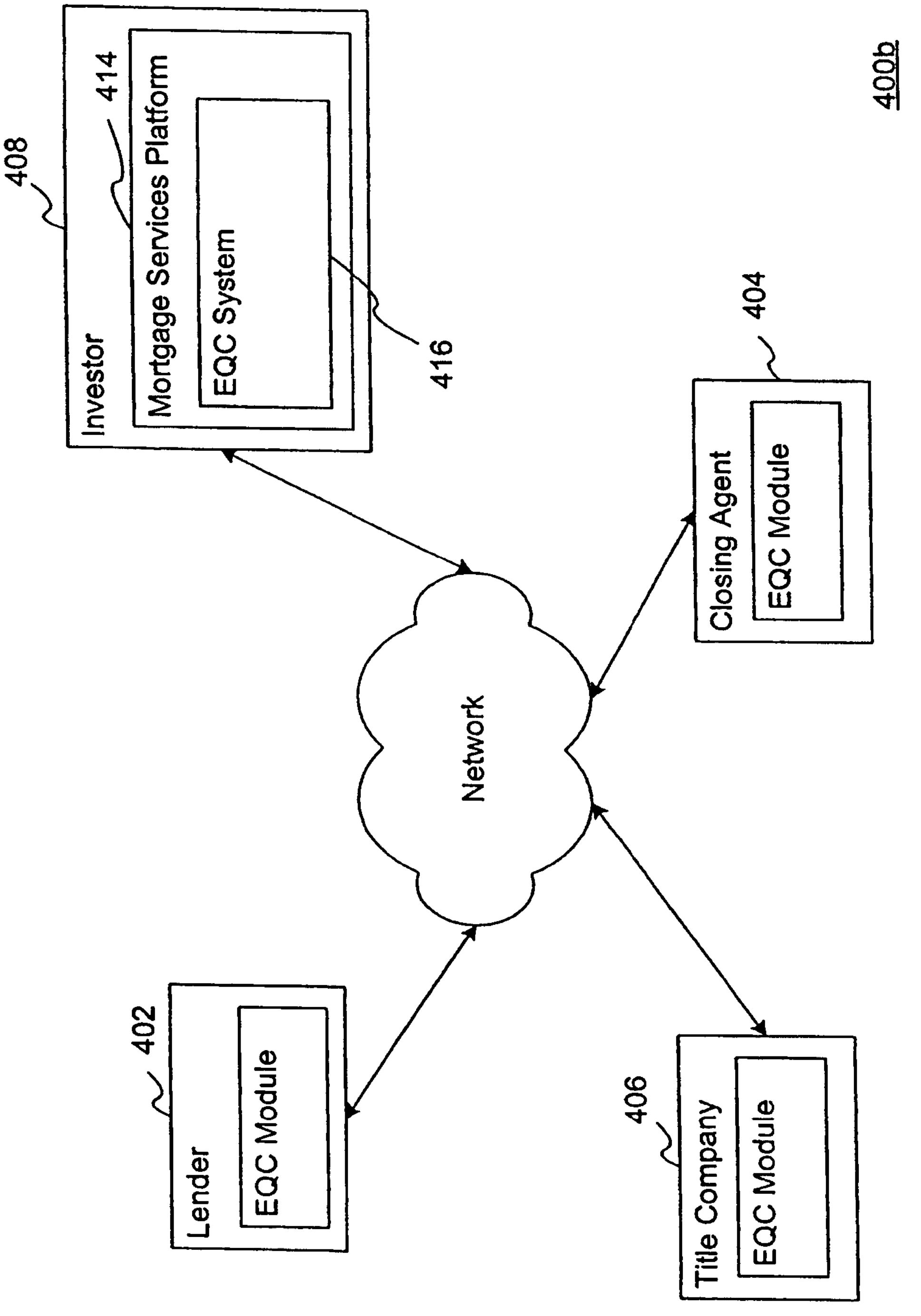

FIGS. 4A-B are schematic diagrams illustrating examples of computer systems 400*a*, 400*b* in which an EQC system operates in accordance with the present invention. In one system 400*a*, the lender 402, closing agent 404, title company 406, and investor 408 are shown. Each of these parties 402-408 can be interconnected by a public network such as the Internet, and they can variously communicate using conventional architectures and protocols, such as according to a client server model implementing the TCP/IP communication protocol suite, and any necessary protocols for transmitting, accessing, displaying, printing, and otherwise using the above described electronic documents. Alternatively, a private network, a combination or public and private networks, or any conventional arrangement for conducting communications appropriate for the described subject matter can interconnect the parties.

The parties also have access to a mortgage services ASP 410, which variously registers the different parties and allows appropriate activities for mortgage transactions. For example, the mortgage services ASP 410 may communicate with the lender 402 to create electronic documents for a closing package. This activity may be complemented by communications with the investor 408, who may provide assistance and information for loan origination and underwriting purposes. The closing agent 404 and title company 406, which may serve as the certifying agent, also can access the electronic documents, such as through receipt of the electronic closing package, etc.

As indicated in FIG. 4B, in some systems 400*b* a mortgage services platform 414 may be provided by one of the parties 402-408. Particularly, the investor may provide the mortgage services platform 414, which would provide services similar to the mortgage services ASP (410). In either case, the mortgage services preferably include an EQC system 412, 416. Additionally, each of the parties 402-408 includes an EQC module having functionality that allows EQC requests to be submitted, and EQC results to be received and displayed. Although certain systems are shown, other systems including but not limited to those for the appraiser, mortgage insurance, hazard, flood certification, and loan servicing agent can similarly connect to the EQC system.

Figure 5:
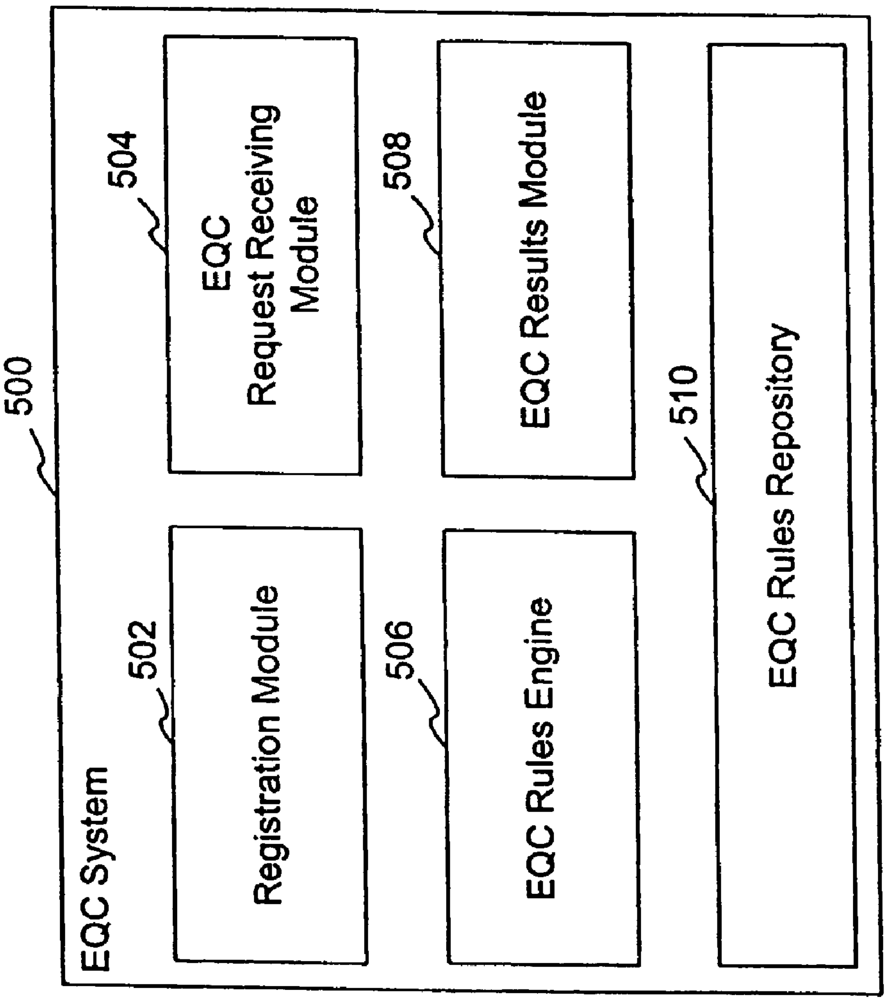
FIG. 5 is a block diagram illustrating an embodiment of an EQC system.

FIG. 5 is a block diagram illustrating an embodiment of an EQC system 500 that includes a registration module 502, an EQC request receiving module 504, an EQC rules engine 506, an EQC results module 508, and an EQC rules repository 510.

The registration module 502 accommodates conventional procedures for determining whether access to the EQC system 500 is appropriate, and authenticates the party connected to the system. Various conventional models may be implemented, but one preferred approach uses a username and password combination. The registration information and the corresponding functionality will also likely be part of the mortgage services platform registration. Accordingly, the username and password used on the mortgage services platform will carry over to the EQC system 500. Registration is optional as there may be users who are not formal registrants.

The EQC request receiving module 506 receives EQC requests. Although requests from lenders and closing agents are mainly described, it is understood that various other types of EQC System participants may also make EQC requests. Examples of these participants include title companies, the county recorder, custodial services, loan servicing agents, and others who would use data in the electronic mortgage document or rely upon the same for their participation in a transaction related to the loan. Additionally, a request may require connection to the data sets used by multiple parties, such as both the lender LOS and the closing agent system. For embodiments implementing the document publication functionality, the EQC request receiving module 506 receives requests for publication of documents usable in a real estate transaction in conjunction with requests to check electronic mortgage datasets.

As indicated, participant systems are configured to include EQC modules configured to generate EQC requests and receive EQC results. The EQC request may be prepared according to the previously described electronic document format. For example, relating to a closing, a lender LOS EQC module extracts LOS data related to a closing, and packages it according to the electronic document format. Since the EQC request will not necessarily entail a viewable document, this EQC request includes header information identifying the data as LOS data, and the main data section includes the underlying fields and corresponding values. As with the electronic closing package, the EQC request can be embodied as a single "electronic document." Alternatively, the EQC request can be included as part of a file format with multiple electronic documents respectively corresponding to the different documents (Note, HUD-1, Appraisal, etc.) to be processed by the EQC system, along with a header identifying the package as an EQC request. Regardless, the header could include a request identifier, username and password information, and instructions for handling the results.

This information is shown by way of example, and many of the fields may be omitted. The request group category of information identifies the type of document that is being analyzed pursuant to the EQC request. Although as indicated one preferred embodiment works with regular data sets, if the EMD happens to be defined according to a particular specification, it can be so noted. The Request and Request Data categories contain information that is used to validate and identify the EQC request, and to similarly call up corresponding EQC results. This information includes the described user name and password. The EQC request receiving module 504 automatically communicates with the registration module 502 upon receipt of an EQC request package containing the username and password, without requiring user intervention to provide the information. An identifier for the EQC request, and a GUID used to retrieve the EQC results in particular (e.g., asynchronous) modes of operation, are also provided in this category of information.

The Mortgage Platform Request category is optional and includes information that is used for identifying participants who are registered with the platform, to accommodate integration with their facilities and appropriate reporting. An

TABLE 1

EQC Request/Functions

| CATEGORY/ATTRIBUTE | FORMAT | DESCRIPTION |
|---|---|---|
| REQUEST_GROUP | | |
| Standards Format Identification | String | Version ID corresponding to electronic document standard, if applicable (null if other EMD) |
| REQUEST | | |
| RequestIdentifier | Integer | Number used to identify the EQC Request |
| RequestDateTime | Datetime | Date time stamp of request. |
| LoginAccountIdentifier | String | User ID. |
| LoginAccountPassword | String | Password. |
| Function_Name | String | Identifies the requested EQC service. |
| REQUEST_DATA | | |
| _GloballyUniqueIdentifier | String | Globally Unique Identifier (GUID) that is returned by the system and used to retrieve the results. Used for asynchronous integrations. |
| CONNECTION | | |
| _ModeIdentifier | String | Identifies the communication model used to submit the request (e.g., asynchronous, synchronous, postback) |
| _PostBackURLIdentifier | String | The URL of the web server where the response will be posted. Required if ModeIdentifier = Postback. |
| MORTGAGE_PLATFORM_REQUEST | | |
| SoftwareProviderAccountNumber | String | Identifies the account number (e.g., for the Loan Origination System or Closing Agent System). |
| CasefileIdentifier | Integer | Identifies the casefile ID of the loan that the function is being requested for. An ID will be created if one does not exist for the loan. |
| LenderInstitutionIdentifier | Integer | Institution ID that identifies the lender or branch. |
| ClosingCompanyIdentifier | String | Identifies the closing company participating in the request. |
| DATA_FILE | | |
| Name | String | Attached eMortgage Platform data file name. |
| VersionNumber | String | Identifies the version of the EQC request. |
| Type | String | The type of attached file (e.g., "EMD", "XML only"). |
| FormatType | String | Used to determine if the attached data set contains current data (System) or data contained on printed documents (Printed). |
| _PopulatingSystemDocumentIdentifier | String | Used to identify the system that has populated the data file (e.g, LOS Identifier) |
| _DateTime | Datetime | The date/time stamp corresponding to the submitted EMD (e.g., UTC format) |

identifier with previously entered loan information (CaseFileIdentifier) can be used to correlate the request to such data.

The Data_File category contains information identifying and describing the data against which the request is processed. Optionally, where the request is integrated with the mortgage services platform, a corresponding file name used by the platform may be provided. The version number for the request is used to distinguish results from various requests (i.e., a data file may be subjected to several EQC requests before and after the closing, or may have initial errors that are corrected—the version number is used to keep track of those results). The type attribute indicates the type of data that is being processed. As described, the document may be a formal electronic mortgage document (EMD), regular XML data, LOS data, etc. The FormatType attribute indicates the actual format of the transactional document, paper or electronic. Other attributes include those that identify the system that populated the data file to be processed (e.g., LOS identifier). Finally, the date/time stamp information corresponding to the EMD is provided. In lieu of requiring a request format to include this information, it can be automatically recognized or extracted from submitted data.

The request receiving module 504 thus receives and recognizes the EQC requests, and passes corresponding requests to the EQC rules engine 506, which in turn accesses appropriate rule sets from the EQC rules repository 510 and applies the rules therein to the subject data.

As indicated, there are various types of rules. Some are comparative, and ensure data consistency. Others check for the presence of required information, or perform more complicated analyses based upon existing information. Some rules include conditions and corresponding rule mappings. The conditions can be determined by Boolean phrases referred to as dependencies. The rule mappings typically identify fields whose values are examined in order to determine whether the mapping is satisfied. Error messages specific to the conditional rules describe the problem where the mapping is not satisfied. These messages are included in the EQC results report (e.g., FIG. 8, FIGS. 9A-B). Example rules are set forth in Table 2 below. The ordinarily skilled artisan will recognize the alternatives, which will be dictated by the type of transaction, corresponding industry custom and usage, and the individual needs and desires of parties using the EQC system.

Still referring to the rules described in Table 2, examples of various types of rules are evident. As is evident from the table, columns Rule ID, Rule Type, Rule Name, Error Message, Dependency and Rule Mapping are provided. The Rule ID allows an indexed organization of all rules and as shown may simply be a number. The Rule Type allows categorization of rules (and corresponding definitions of rule sets) according to the participants corresponding to the EQC request. Examples of these include "Lender Intra" rules, which may be used where a lender specific EQC request is made, "Closing Agent Intra" rules, which may be used where a closing agent specific EQC request is made, and "Lender/Closing Agent Inter" rules, which may be used where an EQC request corresponding to both lender and closing agent data is made. The error message column defines the error message to be presented in the event that a rule is not satisfied or passed. These pieces of information are used to populate the EQC reports. The dependency column lists conditions that are used to provide conditional dependencies that trigger application of rule mappings. They can be thought of as part of the rule themselves, or as prerequisites for the actual rule (which would be the rule mapping). For example, with reference to Rule ID #1, where a face to face interview is made, a government monitoring section must be completed, even if the applicant indicates a refusal to provide the information. Thus, if the field Loan_Application_Interviewer_Information_ApplicationTakenMethodType has the value "Face to Face," then the following rule mapping applies: the field Loan_Application_Borrower_Government_Monitoring_RaceNationalOriginType cannot have a null value OR the field Loan_Application_Borrower_Govemment_Monitoring_RaceNationalOriginRefusalIndicator must equal "Y".

These and other rules, rule dependencies, and mappings are evident in the provided table.

TABLE 2

Sample Rules

| Rule ID | Rule Type | Rule Name | Error Message | Dependency | Rule Mapping |
|---|---|---|---|---|---|
| Conditional on INTERVIEWER_INFORMATION ApplicationTakenMethodType | | | | | |
| 1 | Lender Intra | The Government Monitoring section must be complete for all face-to-face interviews. | Government Monitoring section is not complete for loan whose application was taken face-to-face. | If LOAN \|_APPLICATION \| INTERVIEWER_INFORMATION ApplicationTakenMethodType = 'FaceToFace' | ((LOAN \|_APPLICATION \| BORROWER \| GOVERNMENT_MONITORING GenderType and LOAN \|_APPLICATION \| BORROWER \| GOVERNMENT_MONITORING RaceNationalOriginType) cannot be null) OR LOAN \|_APPLICATION \| BORROWER \| GOVERNMENT_MONITORING RaceNationalOriginRefusalIndicator = "Y". |
| Conditional on BalloonIndicator | | | | | |
| 2 | Lender Intra | If loan is not a balloon, the maturity date must be equal to the first payment date plus less one month plus the loan term. | Maturity date not correct. | If LOAN \|_APPLICATION \| LOAN_PRODUCT_DATA \| LOAN_FEATURES BalloonIndicator = 'N' | LOAN \|_APPLICATION \| LOAN_PRODUCT_DATA \| LOAN_FEATURES MaturityDate MUST EQUAL ((LOAN \|_APPLICATION \| LOAN_PRODUCT_DATA \| LOAN_FEATURES ScheduledFirstPaymentDate plus LOAN \|_APPLICATION \| |

TABLE 2-continued

| Rule ID | Rule Type | Rule Name | Error Message | Dependency | Rule Mapping |
|---|---|---|---|---|---|
| Sample Rules | | | | | |
| | | | | | LOAN_PRODUCT_DATA \| LOAN_FEATURES LoanOriginalMaturityTermMonths) minus one month). |
| Conditonal on LoanAmortizationType | | | | | |
| 3 | Lender Intra | Life Rate Cap must be present for ARM loans. | Life Rate Cap is missing | If LOAN \|_APPLICATION \| MORTGAGE_TERMS LoanAmortizationType = "AdjustableRate" | LOAN \|_APPLICATION \| LOAN_PRODUCT_DATA \| ARM RateAdjustmentLifetimeCapPercent cannot be null. |
| 4 | Lender Intra | Margin must be present for ARM loans. | Margin in missing. | If LOAN \|_APPLICATION \| MORTGAGE_TERMS LoanAmortizationType = "AdjustableRate" | LOAN \|_APPLICATION \| LOAN_PRODUCT_DATA \| ARM_IndexMarginPercent cannot be null. |
| 5 | Lender Intra | Margin must be formatted as xx.xxx for ARM loans. Margin must also be spelled out. | Margin is formatted incorrectly. | If LOAN \|_APPLICATION \| MORTGAGE_TERMS LoanAmortizationType = "AdjustableRate" | LOAN \|_APPLICATION \| LOAN_PRODUCT_DATA \| ARM_IndexMarginPercent must be in the format of xx.xxx (must be rounded to three places to the right of the decimal). Value must also be spelled out. |
| 6 | Lender Intra | Subsequent adjustment cap must be present for ARM loans. | Subsequent Adjustment Cap is missing. | If LOAN \|_APPLICATION \| MORTGAGE_TERMS LoanAmortizationType = "AdjustableRate" | LOAN \|_APPLICATION \| LOAN_PRODUCT_DATA \| RATE_ADJUSTMENT_SubsequentCapPercent cannot be null. |
| 7 | Lender Intra | First payment adjustment cap must be present for ARM loans. | First Payment Adjustment Cap is missing. | If LOAN \|_APPLICATION \| MORTGAGE_TERMS LoanAmortizationType = "AdjustableRate" | LOAN \|_APPLICATION \| LOAN_PRODUCT_DATA \| RATE_ADJUSTMENT_InitialCapPercent cannot be null. |
| 8 | Lender Intra | First payment adjustment floor must be present for ARM loans. | First Payment Adjustment Floor is missing. | If LOAN \|_APPLICATION \| MORTGAGE_TERMS LoanAmortizationType = "AdjustableRate" | LOAN \|_APPLICATION \| LOAN_PRODUCT_DATA \| RATE_ADJUSTMENT_FirstChangeFloor Percent cannot be null. |
| 9 | Lender Intra | Interest Rate Change Date must be present for all ARM loans. | Interest Rate Change Date is missing. | If LOAN \|_APPLICATION \| MORTGAGE_TERMS LoanAmortizationType = "AdjustableRate" | LOAN \|_APPLICATION \| LOAN_PRODUCT_DATA \| RATE_ADJUSTMENT FirstRateAdjustmentDate cannot be null. |
| Conditional on LoanAmortizationType and ARM_ConversionOptionIndicator | | | | | |
| 10 | Lender Intra | Conversion options must be present for ARM loans that are convertible. | Conversion options are missing. | If LOAN \|_APPLICATION \| MORTGAGE_TERMS LoanAmortizationType = "AdjustableRate" and LOAN \| APPLICATION \| LOAN_PRODUCT_DATA \|_ ARM_ConversionOption-Indicator = "Y" | (LOAN \|_APPLICATION \| LOAN_PRODUCT_DATA \| ARM \|_ CONVERSION_OPTION_FeeAmount, LOAN \|_APPLICATION \| LOAN_PRODUCT_DATA \| ARM \|_ CONVERSION_OPTION_FeePercent, LOAN \|_APPLICATION \| LOAN_PRODUCT_DATA \| ARM \|_ CONVERSION_OPTION_PeriodEndPay-mentNumber, LOAN \|_APPLICATION \| LOAN_PRODUCT_DATA \| ARM \|_ CONVERSION_OPTION_PeriodStartPay-mentNumber) cannot be null |
| Conditional on LOAN_PURPOSE_Type | | | | | |
| 11 | Lender/ Closing Agent Inter | Assumption Fee payee in Lender system must match Assumption Fee payee in Closing Agent system. | Assumption Fee Payee does not match in Lender and Closing Agent system. | If LOAN \|_APPLICATION LOAN_PURPOSE_Type = "Purchase" | LOAN \|_APPLICATION \| RESPA_FEE \|_ PAYMENT_PaidByTypeThirdPartyName where LOAN \|_APPLICATION \| RESPA_FEE_SpecifiedHUDLineNumber = '807' Data point from Lender data file and data point from Closing Agent data file must be the same. |
| 12 | Lender/ Closing Agent Inter | Assumption Fee amount in Lender system must match Assumption Fee amount in Closing Agent system. | Assumption Fee Amount does not match in Lender and Closing Agent system. | If LOAN \|_APPLICATION LOAN_PURPOSE_Type = "Purchase" | LOAN \|_APPLICATION \| RESPA_FEE \|_ PAYMENT Amount where LOAN \|_ APPLICATION \| RESPA_FEE_SpecifiedHUDLineNumber = '807' Data point from Lender data file and data point from Closing Agent data file must be the same. |

TABLE 2-continued

Sample Rules

| Rule ID | Rule Type | Rule Name | Error Message | Dependency | Rule Mapping |
|---|---|---|---|---|---|
| 13 | Lender/ Closing Agent Inter | Does Line 101 = Line 401 = LOS Sales Price? | Sales Price on HUD-1 (line 101 and 401) does not match value in Lender system. | If LOAN \|_APPLICATION LOAN_PURPOSE_Type = "Purchase" | ((LOAN \|_CLOSING_DOCUMENTS \| RESPA_HUD_DETAIL_LineItemAmount where LOAN \|_ CLOSING_DOCUMENTS \| RESPA_HUD_DETAIL SpecifiedHUDLineNumber = '101' MUST EQUAL LOAN \|_ CLOSING_DOCUMENTS \| RESPA_HUD_DETAIL_LineItemAmount where LOAN \|_ CLOSING DOCUMENTS \| RESPA_HUD_DETAIL_SpecifiedHUDLine-Number = '401') in Closing Agent file). These values must both equal Lender Field: LOAN \|_APPLICATION \| TRANSACTION_DETAIL PurchasePriceAmount |
| 14 | Lender/ Closing Agent Inter | Deposit or Earnest Money on line 201 of HUD-1 must equal amount in Loan Origination System. | Earnest Money on HUD-1 (line 201) does not match value in Lender system. | If LOAN \|_APPLICATION LOAN_PURPOSE_Type = "Purchase" | (LOAN \|_CLOSING_DOCUMENTS \| RESPA_HUD_DETAIL_LineItemAmount where LOAN \|_ CLOSING_DOCUMENTS \| RESPA_HUD_DETAIL_SpecifiedHUDLine-Number = '201') from Closing Agent file MUST EQUAL (LOAN \|_APPLICATION \| TRANSACTION_DETAIL \| PURCHASE_CREDIT_Amount where LOAN \|_APPLICATION \| TRANSACTION_DETAIL \| PURCHASE_CREDIT_Type = "EarnestMoney") |
| 15 | Closing Agent Intra | Total Settlement Charges to seller HUD-1 line 1400 must match Settlement Charges to seller on HUD-1 line 502. | Line 1400 on HUD-1 does not match line 502. | If LOAN \|_APPLICATION LOAN_PURPOSE_Type = "Purchase" | LOAN \|_CLOSING_DOCUMENTS \| RESPA_HUD_DETAIL_LineItemAmount where LOAN \|_ CLOSING_DOCUMENTS \| RESPA_HUD_DETAIL_SpecifiedHUDLine-Number = '1400' and LOAN \|_ CLOSING_DOCUMENTS \| RESPA_HUD_DETAIL_ LineItemPaidByType = "Seller" MUST EQUAL LOAN \|_CLOSING_DOCUMENTS \| RESPA_HUD_DETAIL_LineItemAmount where LOAN \|_ CLOSING_DOCUMENTS \| RESPA_HUD_DETAIL_SpecifiedHUDLine-Number = '502' |
| 16 | Closing Agent Intra | Contract Sales Price on line 101 and 401 of HUD-1 must be greater than 0.00. | Contract Sales Price on HUD-1 (line 401) is not greater than 0.00. | If LOAN \|_APPLICATION LOAN_PURPOSE_Type = "Purchase" | LOAN \|_CLOSING_DOCUMENTS \| RESPA_HUD_DETAIL_LineItemAmount where LOAN \|_ CLOSING_DOCUMENT \| RESPA_HUD_DETAIL_SpecifiedHUDLine-Number IN ('101','401') must be > 0.00. |
| 17 | Closing Agent Intra | Contract Sales Price on line 101 and 401 of HUD-1 must be equal to 0.00 or null. | Contract Sales Price on HUD-1 (line 401) should not be present for refinances. | If LOAN \|_APPLICATION LOAN_PURPOSE_Type = "Refinance" | LOAN \|_CLOSING_DOCUMENTS \| RESPA_HUD_DETAIL_LineItemAmount where LOAN \|_ CLOSING_DOCUMENTS \| RESPA_HUD_DETAIL_SpecifiedHUDLine-Number IN ('101','401') MUST BE (= 0.00 or NULL). |
| Conditional on LOAN_PURPOSE_Type, LOAN_FEATURES_ConformingIndicator and CONSTRUCTION_REFINANCE_DATA GSERefinancePurposeType | | | | | |
| 18 | Closing Agent Intra | HUD line 303 must not exceed the lesser of 2% of the principal amount or $2000 for conforming loans that are not cash-out refinances. | Cash back to borrower exceeds the lesser of 2% of principal amount or $2000. | If LOAN \|_APPLICATION LOAN_PURPOSE_Type = "Refinance" AND LOAN \|_ APPLICATION \| LOAN_PRODUCT_DATA \|_ LOAN_FEATURES ConformingIndicator = "Y" AND LOAN \|_ APPLICATION \| LOAN_PURPOSE \| CONSTRUCTION_REFI-NANCE_DATA | LOAN \|_CLOSING_DOCUMENTS \| RESPA_HUD_DELAIL_LineItemAmount (where LOAN \|_ CLOSING_DOCUMENTS \| RESPA_HUD_DETAIL_SpecifiedHUDLine-Number = '303') MUST BE <= (the lesser of (.02 * LOAN \|_ APPLICATION \| MORTGAGE_TERMS LoanAmount OR $2000)) |

TABLE 2-continued

| Sample Rules | | | | | |
|---|---|---|---|---|---|
| Rule ID | Rule Type | Rule Name | Error Message | Dependency | Rule Mapping |
| | | | | GSERefinancePurposeType in (“NoCashOutFHAStreamlined-Refinance”, “NoCashOutFREOwnedRefi-nance”, “NoCashOutOther”, “NoCashOutStreamlinedRefi-nance”, “ChangeInRateTerm”) | |
| Conditional on MORTGAGE_TERMS MortgageType | | | | | |
| 19 | Lender Intra | First payment date must be the first day of the month for VA and FHA insured loans. | First Payment Date is not first of month. | If LOAN \|_APPLICATION \| MORTGAGE_TERMS MortgageType IN (“VA”, “FHA”) | ((LOAN \|_APPLICATION \| LOAN_PRODUCT_DATA \| LOAN_FEATURES ScheduledFirstPaymentDate (DD)) MUST = “1” |
| 20 | Lender Intra | VA insured loans must not exceed $240,000. | Loan amount exceeds VA limit of $240,000. | If LOAN \|_APPLICATION \| MORTGAGE_TERMS MortgageType = “VA” | LOAN \|_APPLICATION \| MORTGAGE_TERMS LoanAmount MUST BE <= 240,000. |
| Conditional on MERS MERSRegistrationIndicator | | | | | |
| 21 | Lender Intra | Loans registered with MERS must have MERS as the Mortgagee. | MERS is not the loan’s Mortgagee. | If LOAN \|_APPLICATION \| MERS MERSRegistrationIndicator = “Y” | LOAN \|_APPLICATION \| MERS MERSOriginalMortgageeOfRecordIndicator MUST = ‘Y’ |
| 22 | Lender Intra | Loans registered with MERS must have a MIN number. | MERS MIN number is missing. | If LOAN \|_APPLICATION \| MERS MERSRegistrationIndicator = “Y” | LOAN \|_APPLICATION \| MERS MERS_MINIdentifier cannot be null |
| Conditional on PROPERTY_State | | | | | |
| 23 | Lender Intra | Flood Certification fees cannot be charged for properties in Connecticut. | Flood Certification fee cannot be charged for loan. | If LOAN \|_APPLICATION \| PROPERTY_State = “Connecticut” | LOAN \|_APPLICATION \| RESPA_FEE \|_ PAYMENT_Amount where LOAN \|_ APPLICATION \| RESPA_FEE_Type = “FloodCertification” must be 0.00 or null. |
| 24 | Lender Intra | Document Preparation fees cannot be charged for properties in Texas. | Document Preparation fee cannot be charged for loan. | If LOAN \|_APPLICATION \| PROPERTY_State = “Texas” | LOAN \|_APPLICATION \| RESPA_FEE \|_ PAYMENT_Amount where LOAN \|_ APPLICATION \| RESPA_FEE_Type = “DocumentPreparationFee” must be 0.00 or null. |
| 25 | Lender Intra | Processing fees cannot be charged for properties in Massachusetts. | Processing fee cannot be charged for loan. | If LOAN \|_APPLICATION \| PROPERTY_State = “Massachusetts” | LOAN \|_APPLICATION \| RESPA_FEE \|_ PAYMENT_Amount where LOAN \|_ APPLICATION \| RESPA_FEE_Type = “ProcessingFee” must be 0.00 or null. |
| 26 | Lender Intra | Loans located in the following states must have a trustee name: Alaska, Arizona, Arkansas, California, Maryland, Texas, Virginia, Washington, Colorado, District of Columbia, Idaho, Mississippi, Missouri, Montana, Nebraska, Nevada, North Carolina, Oregon, Tennessee | Trustee name is missing. | If LOAN \|_APPLICATION \| PROPERTY_State IN (Alaska, Arizona, California, Maryland, Texas, Virginia, Washington, Arkansas, Colorado, District of Columbia, Idaho, Mississippi, Missouri, Montana, Nebraska, Nevada, North Carolina, Oregon, Tennessee) | LOAN \|_CLOSING_DOCUMENTS \| RECORDABLE_DOCUMENT \| TRUSTEE_UnparsedName must not be null. |
| 27 | Lender/ Closing Agent Inter | For loans not located in California, Nevada, Arizona, Hawaii, New Mexico or Washington, | Settlement Date on HUD-1 does not match value in Lender system. | If LOAN \|_APPLICATION \| PROPERTY_State NOT IN (“California”, “Nevada”, “Arizona”, “Hawaii”, “New Mexico”, “Washington”) | LOAN \|_CLOSING_DOCUMENTS \| LOAN_DETAILS ClosingDate Data point from Lender data file and data point from Closing Agent data file must be the same. |

TABLE 2-continued

| Sample Rules | | | | | |
|---|---|---|---|---|---|
| Rule ID | Rule Type | Rule Name | Error Message | Dependency | Rule Mapping |
| | | settlement date (Box 1) must match LOS closing date. | | | |
| Conditonal on LOAN_FEATURES_ConformingIndicator, PROPERTY_FinancedNumberOfUnits and PROPERTY_State | | | | | |
| 28 | Lender Intra | Conforming loans for single unit properties not located in Alaska or Hawaii must not exceed $322,700. | Loan amount exceeds conforming limit of $322,700. | If LOAN \|_APPLICATION \| LOAN_PRODUCT_DATA \|_ LOAN_FEATURES ConformingIndicator = "Y" and LOAN \|_ APPLICATION \| PROPERTY_FinancedNumber-OfUnits = "1" and LOAN \|_ APPLICATION \| PROPERTY_State < > ("Alaska" or "Hawaii") | LOAN \|_APPLICATION \| MORTGAGE_TERMS LoanAmount must be <= 322,700. |
| 29 | Lender Intra | Conforming loans for single unit properties located in Alaska or Hawaii must not exceed $484,050. | Loan amount exceeds conforming limit of $484,050. | If LOAN \|_APPLICATION \| LOAN_PRODUCT_DATA \|_ LOAN_FEATURES ConformingIndicator = "Y" and LOAN \|_ APPLICATION \| PROPERTY_FinancedNum-berOfUnits = "1" and LOAN \|_ APPLICATION \| PROPERTY_State = ("Alaska" or "Hawaii") | LOAN \|_APPLICATION \| MORTGAGE_TERMS LoanAmount must be <= 484,050. |
| Conditional on LOAN_FEATURES EscrowWaiverIndicator | | | | | |
| 30 | Lender/ Closing Agent Inter | The sum of lines 1001-1008 on the HUD1 must match the initial escrow deposit amount in the Lender system. | Initial escrow deposit on HUD-1 (sum of lines 1001-1008) does not match value in Lender system. | If LOAN \|_APPLICATION \| LOAN_PRODUCT_DATA \|_ LOAN_FEATURES EscrowWaiverIndicator = "N" | Sum (LOAN \|_APPLICATION \| RESPA_FEE \|_ PAYMENT_Amount where LOAN \|_ APPLICATION \| RESPA_FEE_SpecifiedHUDLineNumber = "1001', '1002', '1003', '1004', '1005', '1006', '1007', '1008') Sum from Lender file and Closing Agent file should be the same. |
| 31 | Lender/ Closing Agent Inter | Hazard insurance months escrowed on HUD-1 (line 1001) must match to Loan Origination System value. | Number of months escrowed for Hazard Insurance on HUD-1 does not match value in Lender system. | If LOAN \|_APPLICATION \| LOAN_PRODUCT_DATA \|_ LOAN_FEATURES EscrowWaiverIndicator = "N" | LOAN \|_APPLICATION \| ESCROW_CollectedNumberOfMonthsCount where LOAN \|_APPLICATION \| ESCROW_ItemType = "HazardInsurance" Data point from Lender data file and data point from Closing Agent data file must be the same. |
| 32 | Lender/ Closing Agent Inter | Hazard insurance amount per month on HUD-1 (line 1001) must match to Loan Origination System value. | Hazard insurance monthly amount on HUD-1 does not match value in Lender system. | If LOAN \|_APPLICATION \| LOAN_PRODUCT_DATA \|_ LOAN_FEATURES EscrowWaiverIndicator = "N" | LOAN \|_APPLICATION \| ESCROW_MonthlyPaymentAmount where LOAN \|_ APPLICATION \| ESCROW_ItemType = "HazardInsurance" Data point from Lender data file and data point from Closing Agent data file must be the same. |
| 33 | Lender/ Closing Agent Inter | Total hazard insurance escrow amount on HUD-1 (line 1001) must match to Loan Origination System value. | Total Hazard Insurance escrow amount does not match value in Lender system. | If LOAN \|_APPLICATION \| LOAN_PRODUCT_DATA \|_ LOAN_FEATURES EscrowWaiverIndicator = "N" | LOAN \|_CLOSING_DOCUMENTS \| RESPA_HUD_DETAIL_LineItemAmount where LOAN \|_ CLOSING_DOCUMENTS \| RESPA_HUD_DETAIL_SpecifiedHUDLine-Number = "1001" Data point from Lender data file and data point from Closing Agent data file must be the same. |
| 34 | Lender/ Closing Agent Inter | Mortgage insurance months escrowed on HUD-1 (line 1002) must match | Number of months escrowed for Mortgage Insurance on HUD-1 does not match value in | If LOAN \|_APPLICATION \| LOAN_PRODUCT_DATA \|_ LOAN_FEATURES EscrowWaiverIndicator = "N" | LOAN \|_APPLICATION \| MI_DATA MICollectedNumberOfMonthsCount Data point from Lender data file and data point from Closing Agent data file must be the same. |

TABLE 2-continued

Sample Rules

| Rule ID | Rule Type | Rule Name | Error Message | Dependency | Rule Mapping |
|---|---|---|---|---|---|
| | | to Loan Origination System value. | Lender system. | | |
| 35 | Lender/ Closing Agent Inter | Mortgage insurance amount per month on HUD-1 (line 1002) must match to Loan Origination System value. | Mortgage insurance monthly amount on HUD-1 does not match value in Lender system. | If LOAN \|_APPLICATION \| LOAN_PRODUCT_DATA \|_ LOAN_FEATURES EscrowWaiverIndicator = "N" | LOAN \|_APPLICATION \| MI_DATA \| MI_RENEWAL_PREMIUM_MonthlyPayment-Amount Data point from Lender data file and data point from Closing Agent data file must be the same. |
| 36 | Lender/ Closing Agent Inter | Total mortgage insurance escrow amount on HUD-1 (line 1002) must match to Loan Origination System value. | Total Mortgage Insurance escrow amount does not match value in Lender system. | If LOAN \|_APPLICATION \| LOAN_PRODUCT_DATA \|_ LOAN_FEATURES EscrowWaiverIndicator = "N" | LOAN \|_CLOSING_DOCUMENTS \| RESPA_HUD_DETAIL_LineItemAmount where LOAN \|_ CLOSING_DOCUMENTS \| RESPA_HUD_DETAIL_SpecifiedHUDLine-Number = "1002" Data point from Lender data file and data point from Closing Agent data file must be the same. |
| 37 | Lender/ Closing Agent Inter | City property taxes months escrowed on HUD-1 (line 1003) must match to Loan Origination System value. | Number of months escrowed for City Property Taxes on HUD-1 does not match value in Lender system. | If LOAN \|_APPLICATION \| LOAN_PRODUCT_DATA \|_ LOAN_FEATURES EscrowWaiverIndicator = "N" | LOAN \|_APPLICATION \| ESCROW_CollectedNumberOfMonthsCount where LOAN \|_ APPLICATION \| ESCROW_ItemType = "CityPropertyTax" Data point from Lender data file and data point from Closing Agent data file must be the same. |
| 38 | Lender/ Closing Agent Inter | City property taxes amount per month on HUD-1 (line 1003) must match to Loan Origination System value. | City Property Tax monthly amount on HUD-1 does not match value in Lender system. | If LOAN \|_APPLICATION \| LOAN_PRODUCT_DATA \|_ LOAN_FEATURES EscrowWaiverIndicator = "N" | LOAN \|_APPLICATION \| ESCROW_MonthlyPaymentAmount where LOAN \|_ APPLICATION \| ESCROW_ItemType = "CityPropertyTax" Data point from Lender data file and data point from Closing Agent data file must be the same. |
| 39 | Lender/ Closing Agent Inter | Total city property taxes escrow amount on HUD-1 (line 1003) must match to Loan Origination System value. | Total City Property Taxes escrow amount does not match value in Lender system. | If LOAN \|_APPLICATION \| LOAN_PRODUCT_DATA \|_ LOAN_FEATURES EscrowWaiverIndicator = "N" | LOAN \|_CLOSING_DOCUMENTS \| RESPA_HUD_DETAIL_LineItemAmount where LOAN \|_ CLOSING_DOCUMENTS \| RESPA_HUD_DETAIL_SpecifiedHUDLine Number = "1003" Data point from Lender data file and data point from Closing Agent data file must be the same. |
| 40 | Lender/ Closing Agent Inter | County property taxes months escrowed on HUD-1 (line 1004) must match to Loan Origination System value. | Number of months escrowed for County Property Taxes on HUD-1 does not match value in Lender system. | If LOAN \|_APPLICATION \| LOAN_PRODUCT_DATA \|_ LOAN_FEATURES EscrowWaiverIndicator = "N" | LOAN \|_APPLICATION \| ESCROW_CollectedNumberOfMonthsCount where LOAN \|_ APPLICATION \| ESCROW_ItemType = "CountyPropertyTax" Data point from Lender data file and data point from Closing Agent data file must be the same. |
| 41 | Lender/ Closing Agent Inter | County Property taxes amount per month on HUD-1 (line 1004) must match to Loan Origination System value. | County Property Tax monthly amount on HUD-1 does not match value in Lender system. | If LOAN \|_APPLICATION \| LOAN_PRODUCT_DATA \|_ LOAN_FEATURES EscrowWaiverIndicator = "N" | LOAN \|_APPLICATION \| ESCROW_MonthlyPaymentAmount where LOAN \|_ APPLICATION \| ESCROW_ItemType = "CountyPropertyTax" Data point from Lender data file and data point from Closing Agent data file must be the same. |
| 42 | Lender/ Closing Agent Inter | Total county property taxes escrow amount on HUD-1 (line 1004) must match to Loan Origination System value. | Total County Property Taxes escrow amount does not match value in Lender system. | If LOAN \|_APPLICATION \| LOAN_PRODUCT_DATA \|_ LOAN_FEATURES EscrowWaiverIndicator = "N" | LOAN \|_CLOSING_DOCUMENTS \| RESPA_HUD_DETAIL_LineItemAmount where LOAN \|_ CLOSING_DOCUMENTS \| RESPA_HUD_DETAIL_SpecifiedHUDLine-Number = "1004" Data point from Lender data file and data point from Closing Agent data file must be the same. |
| 43 | Lender/ Closing Agent | Annual assessments months escrowed | Number of months escrowed for Annual Assessments on | If LOAN \|_APPLICATION \| LOAN_PRODUCT_DATA \|_ LOAN_FEATURES | LOAN \|_APPLICATION \| ESCROW_CollectedNumberOfMonthsCount where LOAN \|_ |

TABLE 2-continued

| Sample Rules | | | | | |
|---|---|---|---|---|---|
| Rule ID | Rule Type | Rule Name | Error Message | Dependency | Rule Mapping |
| | Inter | on HUD-1 (line 1005) must match to Loan Origination System value. | HUD-1 does not match value in Lender system. | EscrowWaiverIndicator = “N” | APPLICATION ❘ ESCROW_ItemType = “Assessment” Data point from Lender data file and data point from Closing Agent data file must be the same. |
| 44 | Lender/ Closing Agent Inter | Annual assessments months escrowed on HUD-1 (line 1005) must match to Loan Origination System value. | Annual Assessments monthly amount on HUD-1 does not match value in Lender system. | If LOAN ❘_APPLICATION ❘ LOAN_PRODUCT_DATA ❘_ LOAN_FEATURES EscrowWaiverIndicator = “N” | LOAN ❘_APPLICATION ❘ ESCROW_MonthlyPaymentAmount where LOAN ❘_ APPLICATION ❘ ESCROW_ItemType = “Assessment” Data point from Lender data file and data point from Closing Agent data file must be the same. |
| 45 | Lender/ Closing Agent Inter | Annual assessments months escrowed on HUD-1 (line 1005) must match to Loan Origination System value. | Total Annual Assessment escrow amount does not match value in Lender system. | If LOAN ❘_APPLICATION ❘ LOAN_PRODUCT_DATA ❘_ LOAN_FEATURES EscrowWaiverIndicator = “N” | LOAN ❘_CLOSING_DOCUMENTS ❘ RESPA_HUD_DETAIL_LineItemAmount where LOAN ❘_ CLOSING_DOCUMENTS ❘ RESPA_HUD_DETAIL_SpecifiedHUDLine-Number = “1005” Data point from Lender data file and data point from Closing Agent data file must be the same. |
| 46 | Closing Agent Intra | For loans where escrows are waived, the aggregate escrow adjustment on lines 1007 and 1008 of the HUD 1 must be blank. | Aggregate Escrow adjusment is not blank. | If LOAN ❘_APPLICATION ❘ LOAN_PRODUCT_DATA ❘_ LOAN_FEATURES EscrowWaiverIndicator = “Y” | LOAN ❘_CLOSING_DOCUMENTS ❘ RESPA_HUD_DETAIL_LineItemAmount where (where LOAN ❘_CLOSING_DOCUMENTS ❘ RESPA_HUD_DETAIL_SpecifiedHUDLine-Number = “1007” or “1008”) MUST BE null or 0.00 |
| 47 | Closing Agent Intra | If escrows are not being waived, an “Escrow Waiver” fee cannot be charged. | Escrow waiver fee cannot be charged for loans where escrows are not waived. | If LOAN ❘_APPLICATION ❘ LOAN_PRODUCT_DATA ❘_ LOAN_FEATURES EscrowWaiverIndicator = “N” | LOAN ❘_APPLICATION ❘ RESPA_FEE ❘_ PAYMENT_Amount where (LOAN ❘_ APPLICATION ❘ RESPA_FEE_Type = “EscrowWaiverFee”) MUST BE = 0.00 or null |

Although Table 2 offers a sample listing of rules and corresponding rule sets for various scenarios, as indicated the rules can be variously organized. Table 3 offers another example of a rules organization. Here, the rules are organized according to the document type and the closing status. The values of these two parameters dictates the identification of the rules in the rule sets. For example, a pre-closing HUD-1 form examination entails different rules than the post-closing review of the same form. Similarly, other types of forms entail different rules even if the closing status is the same. Again, these rules are offered by way of example. The ordinarily skilled artisan will recognize the alternatives.

TABLE 3

| Rules by Closing Status and Document Type | | | | |
|---|---|---|---|---|
| Ref. No. | Pre-Closing Check? | Post-Closing Check? | Subject Document | Review Task |
| N-1 | X | X | Note | Verify Document/Closing Date (Except in Dry Funding States) |
| N-2 | X | X | Note | Verify Loan Amount |
| N-3 | X | X | Note | Verify Principal & Interest Payment |
| N-4 | X | | Note | Verify Borrower Names (on first page & signature lines) |
| N-6 | X | X | Note | Determine whether the loan will be FHA-Insured |
| N-6a | X | X | Note | If N-6 = “Yes”, Verify FHA Case Number |
| N-6b | | X | Note | If N-6 = “Yes”, Verify FHA Allonge Signed/Complete |
| N-7 | X | X | Note | Verify First Payment Date |
| N-8 | | X | Note | Determine whether a Power of Attorney applies |
| N-8a | | X | Note | If N-8 = “Yes”, Verify signatures against POA |
| N-9 | X | X | Note | Verify Maturity Date |
| N-10 | | X | Note | Verify all white-out/strikethrough areas are initialed |
| N-11 | X | X | Note | Verify Loan Number |
| N-12 | X | X | Note | Determine whether the loan is an ARM |
| N-12a | X | X | Note | Verify Change Date |
| N-12b | X | X | Note | Verify Margin |
| N-12c | X | X | Note | Verify Index |
| N-12d | | X | Note | Verify Conversion Options are correct |

TABLE 3-continued

Rules by Closing Status and Document Type

| Ref. No. | Pre-Closing Check? | Post-Closing Check? | Subject Document | Review Task |
|---|---|---|---|---|
| N-12e | X | | Note | Verify Payment Change Caps/Ceiling/Floor |
| N-12f | | X | Note | Verify "ARM Confirmation" in file |
| N-12g | | X | Note | Verify ARM docs are appropriate for the program |
| N-13 | X | | Note | Verify Note is Valid in Property State |
| N-14 | X | X | Note | Verify Interest Rate |
| N-15 | X | | Note | Verify Property Address |
| N-16 | X | | Note | Verify Late Charge Terms by product and state |
| N-17 | | X | Note | Verify that Signed Original Document is Present |
| N-18 | | X | Note | Verify All Pages Are Present |
| N-19 | | X | Note | Verify Lender Name |
| N-20 | | X | Note | Verify Endorsement Accuracy |
| N-21 | | X | Note | Verify Balloon Addendum Present/Accurate (if applicable) |
| SI-1 | X | X | Security Instrument | Verify Document Date (Except in Dry Funding States) |
| SI-2 | X | X | Security Instrument | Verify Loan Amount |
| SI-3 | | X | Security Instrument | Verify Borrower Names Signed as Typed |
| SI-4 | X | X | Security Instrument | Verify Loan Number |
| SI-5 | X | X | Security Instrument | Verify Legal Description |
| SI-6 | X | X | Security Instrument | Verify Property Address |
| SI-7 | X | X | Security Instrument | Verify Maturity Date |
| SI-8 | X | X | Security Instrument | Verify all appropriate riders are attached |
| SI-9 | X | | Security Instrument | Verify Borrower Name(s) & Signature Lines against Vesting |
| SI-10 | X | | Security Instrument | If N-6 = "Yes", Verify FHA Case Number |
| SI-11 | X | | Security Instrument | Verify County |
| SI-12 | | X | Security Instrument | Verify All Pages Are Present |
| SI-13 | | X | Security Instrument | Verify Lender Name |
| SI-13 | X | X | Security Instrument | Verify MERS Number |
| ARM-1 | | X | ARM Rider | Verify Change Date |
| ARM-2 | | X | ARM Rider | Verify Margin |
| ARM-3 | | X | ARM Rider | Verify Index |
| ARM-4 | | X | ARM Rider | Verify Conversion Options are correct |
| ARM-5 | | X | ARM Rider | Verify Documents are appropriate for the program |
| HUD-1 | | X | HUD-1 | Verify no State Unallowable Charges |
| HUD-2 | | X | HUD-1 | Verify no FHA/VA Unallowable Charges |
| HUD-3 | | X | HUD-1 | Verify no Other Unallowable Charges |
| HUD-4 | | X | HUD-1 | Compare Deposit Amount to Purchase Agreement |
| HUD-5 | | X | HUD-1 | Verify Interim (Prepaid) Interest |
| HUD-6 | | X | HUD-1 | Verify Buyer/Seller Signatures are present |
| HUD-7 | X | X | HUD-1 | Verify Underwriting Fee |
| HUD-8 | X | X | HUD-1 | Verify Document Preparation Fee |
| HUD-9 | X | | HUD-1 | Verify Origination Fee (Line 801) |
| HUD-10 | X | | HUD-1 | Verify Discount Fee (Line 802) |
| HUD-11 | X | | HUD-1 | Verify Credit Report Fee (Line 804) |
| HUD-12 | X | | HUD-1 | Verify Appraisal Fee (Line 803) |
| HUD-13 | X | | HUD-1 | Verify Lender's Inspection Fee (Line 805) |
| HUD-14 | X | | HUD-1 | Verify Mortgage Insurance Application Fee (Line 806) |
| HUD-15 | X | | HUD-1 | Verify Assumption Fee (Line 807) |
| HUD-16 | X | | HUD-1 | Verify CLO Access Fee (Section 800) |
| HUD-17 | X | | HUD-1 | Verify Tax Service Fee ("Tax Related Service Fee" per DTD—Section 800) |
| HUD-18 | X | | HUD-1 | Verify Buydown Fee (Section 800—Text String Search) |
| HUD-19 | X | | HUD-1 | Verify Construction Fee (Section 800—Text String Search) |
| HUD-20 | X | | HUD-1 | Verify Yield Spread Differential (Section 800—Text String Search) |
| HUD-21 | X | | HUD-1 | Verify Loan Processing Fee ("Processing Fee" per DTD—Section 800) |
| HUD-22 | X | | HUD-1 | Verify Application Fee (Section 800) |
| HUD-23 | X | | HUD-1 | Verify State Bond/Agency Fee (Section 800) |
| HUD-24 | X | | HUD-1 | Verify Commitment Fee (Section 800) |
| HUD-25 | X | | HUD-1 | Verify Supplemental Orig Fee (Section 800) |
| HUD-26 | X | | HUD-1 | Verify Flood Determination Fee (DTD = "Flood Certification"—Section 800) |
| HUD-27 | X | | HUD-1 | Verify Flood Zone Fee (Section 800—Text String Search) |
| HUD-28 | X | | HUD-1 | Verify MCC Fee (Section 800—Text String Search) |
| HUD-29 | X | | HUD-1 | Verify Bond Participation Fee (Section 800—Text String Search) |
| HUD-30 | X | | HUD-1 | Verify "Reservation Fee" (Section 800—Text String Search) |
| HUD-31 | X | | HUD-1 | Verify TEX/VET Origination Fee (Section 800—Text String Search) |
| HUD-32 | X | | HUD-1 | Verify PERS Review Fee (Section 800—Text String Search) |

TABLE 3-continued

| Rules by Closing Status and Document Type | | | | |
|---|---|---|---|---|
| Ref. No. | Pre-Closing Check? | Post-Closing Check? | Subject Document | Review Task |
| HUD-33 | X | | HUD-1 | Verify CHFA Max Fee (Section 800—Text String Search) |
| HUD-34 | X | | HUD-1 | Verify CALRA Mortgage Loan Review Fee (Section 800—Text String Search) |
| HUD-35 | X | | HUD-1 | Verify CALRA Compliance Review Fee (Section 800—Text String Search |
| HUD-36 | X | | HUD-1 | Verify Compliance Inspection Fee (Section 800—Text String Search) |
| HUD-37 | X | | HUD-1 | Verify Deposit Verification Fee (Section 800—Text String Search) |
| HUD-38 | X | | HUD-1 | Verify Housing Second Mortgage Fee (Section 800—Text String Search) |
| HUD-39 | X | | HUD-1 | Verify Insurance Tracking Fee (Section 800—Text String Search) |
| HUD-40 | X | | HUD-1 | Verify MERS Registration Fee (Section 800—Text String Search) |
| HUD-41 | X | | HUD-1 | Verify Const-Perm Administration Fee (Section 800—Text String Search) |
| HUD-42 | X | | HUD-1 | Verify Quality File Fee - Wholesale Only (Section 800—Text String Search) |
| HUD-43 | X | | HUD-1 | Verify Construction Interest (Section 900—Text String Search) |
| HUD-44 | X | | HUD-1 | Verify Per Diem Interest Differential (Section 900—Text String Search) |
| HUD-45 | X | | HUD-1 | Verify Contingency Reserve (Section 1300—Text String Search) |
| HUD-46 | X | | HUD-1 | Verify PITI Reserves (Section 1300—Text String Search) |
| HUD-47 | X | | HUD-1 | Verify Administration Fee (Section 1300—Text String Search) |
| HUD-48 | X | | HUD-1 | Verify Amortization Schedule Fee (DTD: "Amortization Fee"—Section 1300) |
| HUD-49 | X | | HUD-1 | Verify Loan Assignment Fee (Section 1300) |
| HUD-50 | X | | HUD-1 | Verify Loan Disbursement Fee (Section 1300—Text String Search) |
| HUD-51 | X | | HUD-1 | Verify Wire Fee (Section 1300—Text String Search) |
| HUD-52 | X | | HUD-1 | Verify Escrow Waiver Fee (Section 1300) |
| HUD-53 | X | | HUD-1 | Verify Miscellaneous Fee in APR (Section 1300—Text String Search) |
| HUD-54 | X | | HUD-1 | Verify MCC Application Extension Fee (Section 1300—Text String Search) |
| HUD-55 | X | | HUD-1 | Verify MCC Closing Extension Fee (Section 1300—Text String Search) |
| HUD-56 | X | | HUD-1 | Verify MCC Late Fee (Section 1300—Text String Search) |
| HUD-57 | X | | HUD-1 | Verify Escrow Holdback Inspection Fee (Section 1300—Text String Search) |
| HUD-58 | X | | HUD-1 | Verify Document Review Fee (Section 1300—Text String Search) |
| HUD-59 | X | | HUD-1 | Verify Const Perm Future Funds to Dis (Section 1300—Text String Search) |
| HUD-60 | X | | HUD-1 | Verify Constr/Perm Initial Draw (Section 1300—Text String Search) |
| HUD-61 | X | | HUD-1 | Verify Constr/Perm Second Draw (Section 1300—Text String Search) |
| HUD-62 | X | | HUD-1 | Verify Constr/Perm Third Draw (Section 1300—Text String Search) |
| HUD-63 | X | | HUD-1 | Verify Constr/Perm Four Draw (Section 1300—Text String Search) |
| HUD-64 | X | | HUD-1 | Verify Constr/Perm Escrow Holdback (Section 1300—Text String Search) |
| HUD-65 | X | | HUD-1 | Verify All Title-Related Charges |
| HUD-66 | | X | HUD-1 | Verify Presence of HUD-1 Addendum & Signatures |
| HUD-67 | | X | HUD-1 | Verify all white-out/strikethrough areas are initialed |
| HUD-68 | X | X | HUD-1 | Verify net funding amount: calculated according to the formula [LOAN AMT less the Sum of Fees verified in Rules HUD-6 thru HUD-69] |
| TIL-1 | | X | Truth-in-Lending | Verify that all appropriate Statements are Completed |
| TIL-2 | | X | Truth-in-Lending | Verify that borrowers have signed |
| TIL-3 | X | | Truth-in-Lending | Verify Date |
| TIL-4 | X | | Truth-in-Lending | Verify Borrower Name(s) |
| TIL-5 | X | | Truth-in-Lending | Verify that APR is reasonable |
| TIL-6 | X | | Truth-in-Lending | Verify P&I Payment Amount |
| TIL-7 | X | | Truth-in-Lending | Verify Prepayment Penalty Status |
| TIL-8 | X | | Truth-in-Lending | Verify Loan Amount |
| TIL-9 | X | | Truth-in-Lending | Verify Signature Lines |
| TIL-10 | X | | Truth-in-Lending | Verify Late Charge Terms |

TABLE 3-continued

Rules by Closing Status and Document Type

| Ref. No. | Pre-Closing Check? | Post-Closing Check? | Subject Document | Review Task |
|---|---|---|---|---|
| PL-1 | | X | Payment Letter | Verify Signatures |
| PL-2 | | X | Payment Letter | Verify Totals are Accurate |
| PL-3 | | X | Payment Letter | Verify Loan Number |
| TC-1 | X | X | Title Commitment | Verify Presence of Title Commitment |
| TC-2 | X | X | Title Commitment | Verify Legal Description |
| TC-3 | X | X | Title Commitment | Verify No Unallowable Exceptions |
| TC-4 | X | X | Title Commitment | Verify Correct Mortgagee |
| TC-5 | X | X | Title Commitment | Verify Correct Mortgagor |
| TC-6 | X | X | Title Commitment | Verify Date Issued (earlier than closing date) |
| TC-7 | | X | Title Commitment | Verify Policy Jacket Present |
| HAZ-1 | X | X | Hazard Insurance | Verify Presence of Original Policy or Binder |
| HAZ-2 | X | X | Hazard Insurance | Verify Adequate Coverage |
| HAZ-3 | X | X | Hazard Insurance | Verify Adequate Term (1 Year Min) |
| HAZ-4 | X | X | Hazard Insurance | Verify Borrower Names |
| HAZ-5 | X | X | Hazard Insurance | Verify Property Address |
| HAZ-6 | X | X | Hazard Insurance | Verify Correct Mortgagee Clause |
| HAZ-7 | X | X | Hazard Insurance | Verify Flood Policy Present (if Required) |
| CI-1 | X | | Closing Instructions | Verify Settlement/Escrow Agent Information |
| CI-2 | X | | Closing Instructions | Verify FHA/VA Case Number |
| CI-3 | X | | Closing Instructions | Verify Loan Number |
| CI-4 | X | | Closing Instructions | Verify Term |
| CI-5 | X | | Closing Instructions | Verify Borrower Name(s) & Vesting |
| CI-6 | X | | Closing Instructions | Verify 1st Payment Date |
| CI-7 | X | | Closing Instructions | Verify Impounds/Taxes |
| CI-8 | X | | Closing Instructions | Verify Loan Amount |
| CI-9 | X | | Closing Instructions | Verify P&I Payment Amount |
| CI-10 | X | | Closing Instructions | Verify Property Address |
| CI-11 | X | | Closing Instructions | Verify Endorsements |
| CI-12 | X | | Closing Instructions | Verify Preliminary Exceptions |
| CI-13 | X | | Closing Instructions | Verify Maturity Date |
| CI-14 | X | | Closing Instructions | Verify Sales Price |
| CI-15 | X | | Closing Instructions | Verify County |
| A-1 | X | | Assignment | Verify Date |
| A-2 | X | | Assignment | Verify Loan Number |
| A-3 | X | | Assignment | Verify Borrower Name (agree to Vesting) |
| A-4 | X | | Assignment | Verify County |
| A-5 | X | | Assignment | Verify Legal Description |
| A-6 | X | | Assignment | Verify Notary Section Complete |
| A-7 | X | | Assignment | Verify Signed by Notary |
| A-8 | X | | Assignment | Verify Assistant Secretary Signature |
| A-9 | X | | Assignment | Verify Notary Stamp Clear |
| A-10 | X | | Assignment | Verify Present |
| MISC-1 | | X | Loan Application | Verify Present and Signed |
| MISC-2 | | X | HUD 92900 Add. | Verify Present and Signed |
| MISC-3 | | X | VA 1802A Add. | Verify Present and Signed |
| MISC-4 | | X | FHA Source of Funds | Verify Present and Signed |
| MISC-5 | | X | Closing Affidavit | Verify Present and Signed |
| MISC-6 | | X | Tax Information Sheet | Verify Present |
| MISC-7 | | X | Notice to Borrower | Verify Present |
| MISC-8 | | X | FHA/VA Escrow Agreement | Verify Present |
| MISC-9 | | X | Survey & Affidavit | Verify Present |
| MISC-10 | | X | Initial Escrow Disc. | Verify Present and Signed |
| MISC-11 | X | X | Right to Cancel | Verify Present |
| MISC-12 | | X | Right to Cancel | Verify Signed |
| MISC-13 | | X | Occupancy Agreement | Verify Present and Signed |

The EQC rules, such as are represented in these tables, are stored in the EQC rules repository 510 using conventional techniques for storing and organizing data. The EQC rules repository 510 can be a separate database of the rules, as described, or could equally by embedded in code that provides the EQC system functionality. The EQC rules repository will be periodically updated to reflect additions to the rules and changes to existing rules. Facilities for submitting new rules, such as where a lender would like to include an additional condition on an EQC request process particularly pertaining to their documents, are also preferably provided. Additionally, parties can create and provide their own particular rules, as described above.

Where the document publication feature is implemented, the EQC rules repository may be further organized to include categories that are useful for that feature. Particularly where the analyzed datasets and corresponding EQC results file are organized as an XML based electronic documents, the rules may be organized as follows. The five categories correspond to those introduced in the description of the Issues Summary section of the EQC results report described above. Namely, the first category of issues is comparison of lender and closing agent data. These rules may be identified by a type attribute value of "Lender/ClosingAgentInter" and appear in the Lender/Closing Agent Data Set Differences section. An example of the format for such rules is provided in Table 4 as follows:

TABLE 4

| RULE ID | FAILED RULE | LENDER CLOSING DOCUMENT DATASET VALUE | CLOSING AGENT DOCUMENT DATASET VALUE |
|---|---|---|---|
| RULE_Identifier | RULE_Name | CHECKED_DATA_ DisplayName "=" CHECKED_DATA_Value Where CHECKED_DATA DataSourceIdentifier = "Lender" and CHECKED_DATA_ DataSetIdentifer = "Printed" | CHECKED_DATA DisplayName "=" CHECKED_DATA_Value Where CHECKED_DATA_ DataSourceIdentifier = "ClosingAgent" and CHECKED_DATA_ DataSetIdentifer = "Printed" |

The second category is errors in the lender's data set, which may be identified by the type attribute value of "LenderIntra" and appear in the Lender Issues For Available Data Sets section. An example of the format for such rules is provided in Table 5:

TABLE 5

| RULE ID | FAILED RULE | LENDER CLOSING DOCUMENT DATASET VALUE | LENDER ORIGINATION SYSTEM DATASET VALUE |
|---|---|---|---|
| RULE_Identifier | RULE_Name | CHECKED_DATA_ DisplayName "=" CHECKED_DATA_Value Where CHECKED_DATA_ DataSourceIdentifier = "Lender" and CHECKED_DATA_ DateSetIdentifer = "Printed" | CHECKED_DATA_ DisplayName "=" CHECKED_DATA_Value Where CHECKED_DATA DataSourceIdentifier = "Lender" and CHECKED_DATA_ DateSetIdentifer = "System" |

The third category is differences between a lender's system and printed documents data sets. These rules are identified by a type attribute value of "LenderDiff" and appear in the Lender Data Set Differences section. Table 6 illustrates an example of the format for these rules.

TABLE 6

| DATA NAME | LENDER CLOSING DOCUMENT DATASET VALUE | LENDER ORIGINATION SYSTEM DATASET VALUE |
|---|---|---|
| CHECKED_DATA DisplayName | CHECKED_DATA_Value Where CHECKED_DATA DataSourceIdentifier = "Lender" and CHECKED_DATA_ DateSetIdentifer = "Printed" | CHECKED_DATA_Value Where CHECKED_DATA DataSourceIdentifier = "Lender" and CHECKED_DATA_ DateSetIdentifer = "System" |

The forth category is errors in the closing agent's data set, which may be identified by a type attribute value of "ClosingAgentIntra" and appear in the Closing Agent Data Set Issues section. An example format for these rules is in Table 7.

TABLE 7

| RULE ID | FAILED RULE VALUE | CLOSING AGENT DOCUMENT DATASET | CLOSING AGENT SYSTEM DATASET VALUE |
|---|---|---|---|
| RULE_Identifier | RULE_Name | CHECKED_DATA_ DisplayName "=" CHECKED_DATA_Value Where CHECKED_DATA_ DataSourceIdentifier = "ClosingAgent" and _DataSetIdentifier = "Printed" | CHECKED_DATA_ DisplayName "=" CHECKED_DATA_Value Where CHECKED_DATA_ DataSourceIdentifier = "ClosingAgent" and _DataSetIdentifier = "System" |

Lastly, the fifth category of issues is differences between a closing agent's system and printed documents data sets. These rules may be identified by a type attribute value of "ClosingAgentDiff" and appear in the Closing Agent Data Set Differences section, with a format as shown in Table 8.

TABLE 8

| DATA NAME | CLOSING AGENT CLOSING DOCUMENT DATASET VALUE | CLOSING AGENT ORIGINATION SYSTEM DATASET VALUE |
|---|---|---|
| CHECKED_DATA DisplayName | CHECKED_DATA_Value Where CHECKED_DATA DataSourceIdentifier = "ClosingAgent" and CHECKED_DATA_ DataSetIdentifer = "Printed" | CHECKED_DATA_Value Where CHECKED_DATA DataSourceIdentifier = "ClosingAgent" and CHECKED_DATA_ DataSetIdentifer = "System" |

As can be seen in the values corresponding to various datasets, the terms "System" and "Printed" are used. When used in conjunction with the publication feature of the present invention, the value "Printed" is an indicia that documents corresponding to the dataset have been published, such as for usage in a closing. Datasets retaining the value "System" are not yet published. Notably, a user may print documents from this dataset without causing them to be considered as published. For example, a Closing Agent (or other user, be it a Lender, Borrower, etc.) might want to print a copy for proofreading, to allow a client (e.g. Borrower) to review the documents, or for any number of reasons. In this instance, the system retains the "system" value in association with the relevant dataset even though the documents have been printed. Only when the documents are formally printed for usage, which is also referred to as publishing them, is the value for the dataset changed from "system" to "printed". Additionally, as will be seen with regard to the publication process discussed further in connection with FIG. 10 below, when a closing package is officially printed (aka published) for a closing, each of the documents in the package are versioned accordingly.

In the example provided above, there are thus four types of datasets on the EQC system. They are "Lender System", "Lender Printed" (aka Lender Published), "Closing Agent System", and "Closing Agent Printed" (aka Closing Agent Published). Each of those datasets are labeled accordingly.

The EQC rules engine 506 includes conventional facilities for examining the database of rules and extracting the appropriate rule set depending upon the EQC request. For example, with reference to the rules in Table 2, certain EQC requests will require accessing rules having a given "Rule Type"; alternatively, with reference to Table 3, certain EQC requests will require accessing rules pertaining to a given closing status and given document type.

The EQC rules engine 506 thus communicates with the EQC rules repository 510 to acquire the necessary rule sets and member rules, for application to the data. An initial validation preferably precedes application of the EQC specific rules to the data, particularly where the EMD is a formal electronic document. This initial validation will comprise a conventional (e.g., XML) validation against a DTD for the formal electronic document, followed by additional custom document validation to check for the integrity of the EMD, such as whether view data matches corresponding main data found in the EMD. Commonly owned application Ser. No. 10/339,775 entitled "Electronic Document Validation" provides more information about these preliminary validation processes.

The EQC rules are then applied to the document. Whether the EMD is an XML-only data set or a formal electronic document containing an XML data section, the EMD will have known fields (e.g., defined by XML elements), having corresponding values. Conventional processing techniques are then used to identify the presence of the elements and obtain the corresponding values where required. Once the values are retrieved, the logical mappings are then applied, again using conventional processing techniques. For example, Rule ID #14 in Table 2 indicates that the deposit or earnest money on line 201 of HUD-1 must equal the amount in the LOS. There, the values for the relevant fields in the HUD-1 and the LOS data are retrieved, and compared to determine that they match. If they do not match, an instance of an error for Rule ID #14 is maintained, so that the subsequently produced report can reflect the mismatch. The EQC rules engine 506 preferably processes all of the rules in the identified rule set until they have been exhausted. Upon completion, the EQC rules engine 506 reports the same to the EQC Results Module 508.

The EQC Results Module 508 communicates with the EQC rules engine 506 and thus receives the list of failed rules. If no rules have failed, then the EQC Results Module 508 prepares a report indicating no findings, or a "pass" result pertaining to the EQC request. If there are failed rules, then the corresponding error messages are retrieved from the rule sets (e.g., from the repository or the rules engine) and are compiled to provide a report. One preferred EQC report format uses the same format as was used for the EQC request. A viewable and/or printable report is provided in the EQC report. The EQC report can also use the formal electronic document standard.

Particularly where the document publication aspect of the present invention is practiced, the results file and corresponding report may be provided by initially checking for the appropriate datasets, which can be accommodated by examining fields in the datasets indicating the type and version of the dataset being examined. In XML embodiments, this may be accommodated by examining relevant elements, which may alone provide the dataset type and/or version information or collectively provide such information (e.g., the type information may be a concatenation of values corresponding to the source (e.g., Lender, or Closing Agent) and type (e.g., Origination System, Closing Document) information). This information is used as the initial basis for determining whether the (e.g., lender, closing agent) datasets are present for examination, and also for populating the above described EMD summary section (e.g., FIG. 9A, 904). The remaining functionality is provided by applying the appropriate rules to the datasets and issuing EQC results as described. The EQC rules and results modules are also configured to provide the document publication functionality that is described further below, and in connection with providing reports with the document manifest.

The EQC system 500 can be variously embodied. The EQC system 500 can entirely comprise software that is stored in conventional media and executed by a conventional processor to provide the above described functionality. The EQC system 500 can also be embodied in the form of a computer system having such as processor and storing such software for execution. These and other alternatives will be recognized by the artisan.

Figure 7:
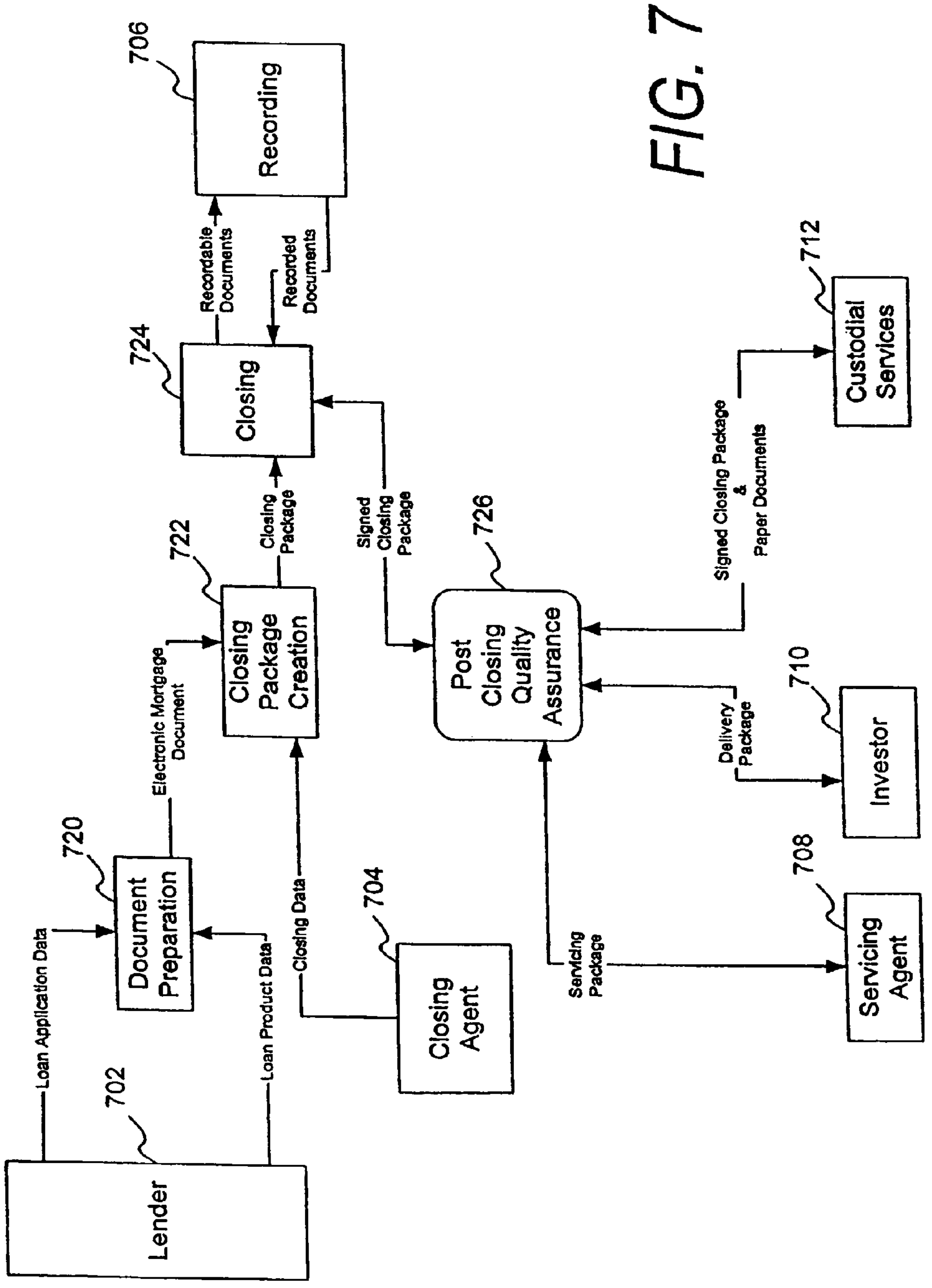
FIG. 7 is a schematic diagram illustrating an application of EQC processes and corresponding transactions.

The EQC System can be invoked pursuant to various transactions. The schematic diagram of FIG. 7 provides an overview of various examples of transactions in the life cycle of an electronic mortgage document. Participants in the illustrated process include the lender 702, closing agent 704, recorder 706, servicing agent 708, investor 710, and custodial services 712. Where electronic documents are being handled, these parties 702-712 can variously communicate over a computer network to effect a mortgage transaction utilizing the certified electronic mortgage document, such as those previously described between the lender, certifying agent, and investor. Additionally, before or after these mortgage transactions, the EQC system provides EQC results corresponding to EQC requests as described above. This includes "downstream" transactions that occur after the closing.

As described above, loan documents are prepared 720, such as via a lender's loan origination system (LOS), and the electronic mortgage document can reside on the LOS or can be uploaded from a document preparer located at a remote location via the computer network. The closing agent 704 receives closing instructions from the lender and the closing documents. Closing package creation 722 can be centralized so that the lender 702 and closing agent 704 can provide the necessary closing data and electronic documents to complete a closing package. Additionally, the closing agent 704 can invoke information provided by the lender 702, and vice versa.

Upon completion of the closing package, a closing 724 involving a traditional ink and pen signing, or digital signing, of relevant documents including the paper mortgage note follows, with the borrower signing the necessary documents. Recording 706 of the executed documents can then proceed, with the recordable documents being sent for recordation, and corresponding indicia of what is recorded.

Also indicated is post closing quality assurance 726, which is provided by the EQC system. Example participants include the servicing agent 708, investor 710 and custodial services 712. Use of the EQC system ensures and confirms that data is consistently implemented for all of the different documents pertaining to the loan, and provides additional quality control aspects as dictated by the rule set. According to this aspect, in addition to applying a first rule set (e.g., for the lender pursuant to a closing) to an EMD corresponding to a closing package, the EQC system receives a second electronic data set for a related function. One example of a related function is that provided by the closing agent, as described above. Other examples of related functions are those provided by the servicing agent, appraiser, and other entities. The EQC system receives the second EMD and applies a second set of quality control rules to the second EMD. Results of this process can be iterative, depending upon satisfaction of the rules, and ultimately will result in an EQC pass result after corrections are made. Here, positive EQC results indicate the second EMD is consistent with the first EMD and appropriate for the function, which again is dictated by rules that can be submitted by the service provider, or combinations of parties. For example, the servicing package that is implemented by the servicing agent 708 is subject to an EQC check following the closing and prior to the exchange. Here, the data in the servicing agent system is submitted to the EQC system to ensure that it is consistent with data that was previously used for the loan pursuant to the closing, and to ensure compliance with any other rules, including those defined by the servicing agent. The servicing agent data for the closing note, deed of trust, assignment, first payment letter, hazard insurance and tax information sheets is among that which is compared to the existing data by the EQC system. This process uses the same type of comparison of field values as described above.

Similarly, as described above in more detail, the investor 710 implements the EQC system in connection with receipt of the delivery package for the loan. Additionally, in connection with the loan being held by the document custodian, wherein the signed closing package and paper documents are provided, the content of the documents can be verified using the EQC system.

Figure 10:
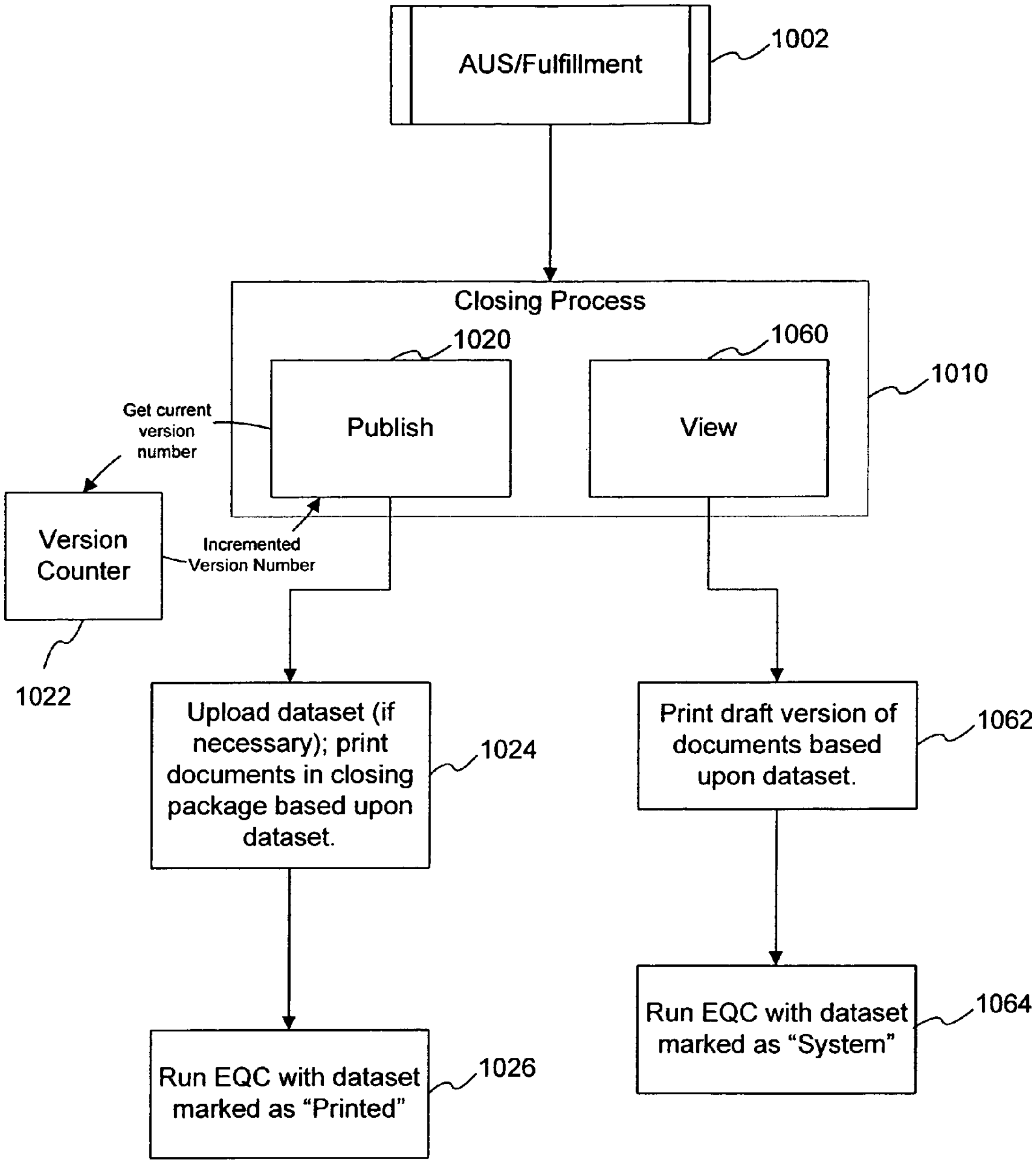
FIG. 10 is a schematic and flow diagram illustrating an embodiment of a process for publishing document sets for real property transactions.

FIG. 10 is a flow diagram illustrating an embodiment of a process 1000 for publishing documents. The above-described document manifest and related features are useful for transactions such as the publication of documents pursuant to a closing, as the manifest allows the opportunity for users to check the list of documents and corresponding version to ensure inclusion of the appropriate documents, as well as the correct versions of those documents. The above-described usage of an indicator on paper mortgage documents that ties the paper document to an electronic dataset as well as the corresponding EQC result for that dataset is also useful for implementing this process 1000. The indicator may be variously provided, such as in the form of a string field created by document providers. Preferably, representation of the document package version number will be supported by this field. In one embodiment, all of the documents in the Document Manifest will have the version number associated with the last valid published version of the document package. Specifically, the version number is associated with the package of documents rather than individual documents within the listing. Thus, "Closing Package Version 1" will be initially published. If there is a later change to any single document within that package for which a new versioning is sought, then all of the documents in the package will be associated with "Closing Package Version 2". When all of the documents are printed for publication, they will thus include the same version number for the closing package, rather than having separate version numbers belonging to each individual document. This allows easy determination that the elements of the closing package are up-to-date.

Of course, although it is not necessarily recommended, there may be instances where users elect not to print to the entire package for closing package version 2. In that case, it is up to the user to determine which documents did not change between the two versions.

For context, the illustrated process 1000 shows origination and closing phases. As described, origination is variously provided by conventional systems that are used to populate documents (1002). This may be accommodated through an Automated Underwriting System (AUS) as indicated or other conventional systems used for origination that need not be described in detail herein.

Pursuant to a closing, at various times and for various purposes, parties may wish to view documents before the formal closing takes place. For example a Lender, Closing Agent or Borrower might wish to review data that is included on the documents to ensure accuracy, to make changes that occur between the original population of the document and the closing, etc. The "closing" process 1010 is divided into publish 1020 and view 1060 components.

Notably, documents may be printed for review as part of the view 1060 component. This is in contrast to publishing the documents, such as in anticipation of the formal closing. Printing 1062 the documents can be accommodated from a selection list that is displayed in connection with a displayed document, or within the document if desired. Preferably, when the documents are printed 1062 during the view component 1060, they will include indicia such as "DRAFT" in lieu of a version number, to clearly indicate that they are not a published version of the documents.

As described above, datasets that are used to produce documents are accorded values useful in connection with receiving EQC requests and producing corresponding EQC results and reports. Document publication is also provided in conjunction with the EQC system functionality. To accommodate that, datasets (or even individual elements within datasets) may be accorded the values "System" and "Printed". When drafts of the documents are printed for review, rather than published, the corresponding dataset will remain denoted as "System". The EQC system functionality described above may thus be applied 1064 to a dataset marked as System during the view 1060 phase of the closing process. This allows users to check data integrity and accuracy on the underlying (e.g., Closing Agent) dataset prior to requesting a publication of the documents.

Publication 1020 of the documents is accommodated in conjunction with the other EQC system features. According to one aspect, the EQC system distinguishes datasets corresponding to published document sets from those that have not yet been published, by associating a "Printed" value with the former. As indicated, when publication 1020 is sought, the documents in a closing package are printed 1024. If necessary, the dataset corresponding to the printed documents is also uploaded to the EQC system, if it does not already reside therein Uploading may or may not be necessary at this stage. This is because some users may use a system that includes the EQC system functionality throughout the process of managing a transaction (e.g., from origination forward). In that instance the datasets will already reside on the EQC system. Other users will invoke the EQC system at this stage, wherein the dataset may be uploaded in conjunction with publication. In either case, the EQC system is used to check the accuracy and completeness of the data used to produce the documents published for the closing package. As indicated, the EQC system functionality is applied 1026 to the corresponding dataset marked as "Printed". Although the described embodiment uses the term "Printed" in association with datasets corresponding to published documents, the artisan may substitute whatever terms are desired for this indication, including but not limited to "Published", etc.

As conceptually indicated in FIG. 10, versioning 1022 is associated with the publication 1020 of documents. According to another aspect of the present invention, versioning is correlated with a set of documents used for a transaction, such as a closing package. The first publication of the closing package may be referred to as "Closing Package Version 1". Preferably, each of the documents that is published as part of the closing package is marked accordingly with this version number. For example, a footer for each document may state "CP v. 1" or the like. Accordingly, whenever a new publication 1020 request is made, the system reviews the version counter 1022, and prompts an increment in the version count to be associated with the set of documents being published in connection with the publication request. In embodiments that store a version number as an element value, this may merely be incrementing this value in association with publication.

If, following a publication, there is a realization that change is desired in one or more of the documents, then values in the datasets may be changed. In this instance, the user will presumably want to run another EQC system check to ensure the accuracy and consistency of and among datasets. This is done in conjunction with publication and versioning according to this embodiment of the present invention. First, the user makes the changes to the datasets. When these changes are made, the corresponding dataset and/or individual values are denoted as System, as they lose publication status as being different from the published version. At some point the user will again be satisfied with the data, and will prompt publication. In this instance, "Closing Package Version 2" is established as the next version number for the closing package. The previously described printing 1024 of the closing package documents, marking of the datasets as published, and application 1026 of the EQC functionality to the datasets marked as published take place. Versioning is associated with the entire closing package. Thus, even if some of the documents remain exactly the same from version-to-version, they will be marked according to the most recent closing package version in association with publication of the closing package. In other words, if version 2 of the closing package is printed, each document in the package is marked "CP v. 2" or the like.

In some embodiments, a formal electronic document, such as an XML or XHTML based document, may be used in conjunction with the document manifest and/or publication aspects of the present invention. In that case, a particular element for managing document publication may be established. The element is used to provide the listing of published (formally printed) documents prepared for use in a transaction such as a closing. Preferably, this listing is accessed and used in conjunction with the above-described validation processes as part of managing the list of documents to be provided for a closing package and ensuring that those documents are checked for accuracy and completeness. The element for managing document publication may be variously provided but preferably includes attributes such as "name" for indicating the name of each document and "version_number" for managing the versioning of documents. Other useful attributes may include a "filename" attribute for identifying a location of a file corresponding to a particular document, "date/time" for indicating a date/time stamp corresponding to a document version, "type" for indicating the document type, "pages_number" for indicating the number of pages in the document, "signature requirements" for indicating whether and how documents are to be signed, and "comments" for indicating various associated comments or instructions. The values of these attributes are useful for assembling the above described listing of documents for a package, along with the related information, for the document manifest.

Although the present invention has been described in considerable detail with reference to certain embodiments thereof, the invention may be variously embodied without departing from the spirit or scope of the invention. Therefore, the following claims should not be limited to the description of the embodiments contained herein in any way.

The invention claimed is:

1. A method for publishing a set of documents corresponding to a mortgage loan application and confirming that the mortgage loan will be subsequently marketable to an investor in the secondary mortgage market, the method comprising:

receiving a request to publish a set of documents that are usable in a closing for the mortgage loan;

accessing an electronic mortgage dataset that is used to populate the set of documents;

applying a quality control process to the electronic mortgage dataset to verify that the electronic mortgage dataset is sufficient to populate and accurately provide the set of documents, and to verify that the electronic mortgage data set complies with a rule set that applies to determine whether the electronic mortgage dataset includes elements that support transferring the loan to the investor;

accommodating a publication of the set of documents by retaining a publication indication in association with the electronic mortgage dataset, the publication indication indicating a publication status for documents created from the electronic mortgage dataset while the electronic mortgage dataset remains in an unchanged state; and providing a quality control report that lists documents in the set of documents, associates the set of documents to the electronic mortgage dataset, and verifies the publication of the set of documents.

2. The method of claim 1, further comprising:

maintaining a version identifier in association with the publication of the set of documents; and providing the version identifier on displayed versions of the set of documents.

3. The method of claim 2, wherein the displayed versions are printed versions.

4. The method of claim 3, wherein the version identifier includes a numeral that is incremented for each publication version of the set of documents.

5. The method of claim 2, wherein the quality control report indicates the version identifier in association with the listed documents.

6. The method of claim 1, further comprising:

receiving changes to the electronic mortgage dataset following the publication of the set of documents, the changes resulting in an altered electronic mortgage dataset; and removing the publication indication from association with the altered electronic mortgage dataset, whereby publication status will not be indicated as applicable to the altered electronic mortgage dataset.

7. The method of claim 6, further comprising:

receiving a second request to publish the set of documents;

accessing the altered electronic mortgage dataset;

applying the quality control process to the altered electronic mortgage dataset to verify that the altered electronic mortgage dataset is sufficient to populate and accurately provide the set of documents; and accommodating a second publication of the set of documents by retaining the publication indication in association with the altered electronic mortgage dataset, the publication indication indicating a publication status for documents created from the altered electronic mortgage dataset while the altered electronic mortgage dataset remains in an unchanged state.

8. The method of claim 7, further comprising:

maintaining a version identifier in association with each publication of the set of documents;

incrementing the version identifier in accommodating the second publication of the set of documents; and providing the version identifier on displayed versions of each of the set of documents.

9. The method of claim 1, wherein the quality control process comprises the steps of:

identifying whether data used to populate a lender's set of documents differs from data used to populate a closing agent's set of documents;

identifying errors in the data contained in a the lender's loan origination system;

identifying whether data used to populate the closing agent's set of documents contained errors; and identifying whether data used to populate the closing agent's set of documents differs from current data in the closing agent's loan origination system.

10. An apparatus for publishing a set of documents corresponding to a mortgage loan application and confirming that the mortgage loan will be subsequently marketable to an investor in the secondary mortgage market, the apparatus comprising:

an EQC request module, which receives a request to publish a set of documents that are usable in a closing for the mortgage loan;

an EQC rules engine, in operative communication with the EQC request module, which accesses an electronic mortgage dataset that is used to populate the set of documents and applies a quality control process to the electronic mortgage dataset to verify that the electronic mortgage dataset is sufficient to populate and accurately provide the set of documents, and to verify that the electronic mortgage data set complies with a rule set that applies to determine whether the electronic mortgage dataset includes elements that support transferring the loan to the investor; and an EQC results module, in operative communication with the EQC request module and the EQC rules engine, which accommodates a publication of the set of documents by retaining a publication indication in association with the electronic mortgage dataset, the publication indication indicating a publication status for documents created from the electronic mortgage dataset while the electronic mortgage dataset remains in an unchanged state, and provides a quality control report that lists documents in the set of documents, associates the set of documents to the electronic mortgage dataset, and verifies the publication of the set of documents.

11. The apparatus of claim 10, wherein the EQC results module also maintains a version identifier in association with the publication of the set of documents, and provides the version identifier on displayed versions of the set of documents.

12. The apparatus of claim 11, wherein the displayed versions are printed versions.

13. The apparatus of claim 12, wherein the version identifier includes a numeral that is incremented for each publication version of the set of documents.

14. The apparatus of claim 11, wherein the quality control report indicates the version identifier in association with the listed documents.

15. The apparatus of claim 10, wherein the EQC rules engine receives an indication of changes to the electronic mortgage dataset following the publication of the set of documents, the changes resulting in an altered electronic mortgage dataset, whereupon the publication indication is removed from association with the altered electronic mortgage dataset.

16. The apparatus of claim 15, wherein the EQC request module receives a second request to publish the set of documents, and in response the EQC rules engine accesses the altered electronic mortgage dataset and applies the quality control process to the altered electronic mortgage dataset to verify that the altered electronic mortgage dataset is sufficient to populate and accurately provide the set of documents, and the EQC results module accommodates a second publication of the set of documents by retaining the publication indication in association with the altered electronic mortgage dataset, the publication indication indicating a publication status for documents created from the altered electronic mortgage dataset while the altered electronic mortgage dataset remains in an unchanged state.

17. The apparatus of claim 16, wherein the EQC results module maintains a version identifier in association with each publication of the set of documents, increments the version identifier in accommodating the second publication of the set of documents, and provides the version identifier on displayed versions of each of the set of documents.

18. The apparatus of claim 10, wherein the quality control process applied by the EQC rules engine comprises the steps of:

identifying whether data used to populate a lender's set of documents differs from data used to populate a closing agent's set of documents;

identifying errors in the data contained in a the lender's loan origination system;

identifying whether data used to populate the closing agent's set of documents contained errors; and identifying whether data used to populate the closing agent's set of documents differs from current data in the closing agent's system.

19. An apparatus for publishing a set of documents corresponding to mortgage loan applications and confirming that the mortgage loans will be subsequently marketable to an investor in the secondary mortgage market, the apparatus comprising:

means for receiving a request to publish a set of documents that are usable in a closing for the mortgage loan;

means for accessing an electronic mortgage dataset that is used to populate the set of documents;

means for applying a quality control process to the electronic mortgage dataset to verify that the electronic mortgage dataset is sufficient to populate and accurately provide the set of documents and to verify that the electronic mortgage data set complies with a rule set that applies to determine whether the electronic mortgage dataset includes elements that support transferring the loan;

means for accommodating a publication of the set of documents by retaining a publication indication in association with the electronic mortgage dataset, the publication indication indicating a publication status for documents created from the electronic mortgage dataset while the electronic mortgage dataset remains in an unchanged state; and means for providing a quality control report that lists documents in the set of documents, associates the set of documents to the electronic mortgage dataset, and verifies the publication of the set of documents.

20. The apparatus of claim 19, further comprising:

means for maintaining a version identifier in association with the publication of the set of documents; and means for providing the version identifier on displayed versions of the set of documents.

21. The apparatus of claim 20, wherein the displayed versions are printed versions.

22. The apparatus of claim 21, wherein the version identifier includes a numeral that is incremented for each publication version of the set of documents.

23. The method of claim 20, wherein the quality control report indicates the version identifier in association with the listed documents.

24. The apparatus of claim 19, further comprising:

means for receiving changes to the electronic mortgage dataset following the publication of the set of documents, the changes resulting in an altered electronic mortgage dataset; and means for removing the publication indication from association with the altered electronic mortgage dataset, whereby publication status will not be indicated as applicable to the altered electronic mortgage dataset.

25. The apparatus of claim 19, wherein the quality control process comprises the steps of:

identifying whether data used to populate a lender's set of documents differs from data used to populate a closing agent's set of documents;

identifying errors in the data contained in a the lender's loan origination system;

identifying whether data used to populate the closing agent's set of documents contained errors; and identifying whether data used to populate the closing agent's set of documents differs from current data in the closing agent's loan origination system.

* * * * *